US012701893B2

(12) United States Patent
Yoo et al.

(10) Patent No.: US 12,701,893 B2
(45) Date of Patent: Aug. 4, 2026

(54) DISPLAY DEVICE INCLUDING AN OPTICAL PATTERN

(71) Applicant: Samsung Display Co., Ltd., Yongin-Si (KR)

(72) Inventors: Byung Han Yoo, Suwon-si (KR); Gee-Bum Kim, Seoul (KR); Kwang Soo Bae, Yongin-si (KR); Bokwang Song, Hwaseong-si (KR); Taekyung Ahn, Yongin-si (KR); Dae-Young Lee, Seoul (KR)

(73) Assignee: Samsung Display Co., Ltd., Yongin-Si (KR)

( * ) Notice: Subject to any disclaimer, the term of this patent is extended or adjusted under 35 U.S.C. 154(b) by 609 days.

(21) Appl. No.: 17/939,345

(22) Filed: Sep. 7, 2022

(65) Prior Publication Data

US 2023/0112427 A1      Apr. 13, 2023

(30) Foreign Application Priority Data

Oct. 7, 2021      (KR) ......................... 10-2021-0132909

(51) Int. Cl.
*H10K 59/60* (2023.01)
*G06F 21/32* (2013.01)
(Continued)

(52) U.S. Cl.
CPC ............. *H10K 59/60* (2023.02); *G06F 21/32* (2013.01); *H10K 50/865* (2023.02); *H10K 59/122* (2023.02); *H10K 59/38* (2023.02)

(58) Field of Classification Search
CPC ...... H10K 59/60; H10K 59/65; H10K 50/865; H10K 59/8792; H10K 59/38; H10K 50/86; H10K 50/844
See application file for complete search history.

(56) References Cited

U.S. PATENT DOCUMENTS

2019/0333971 A1* 10/2019 Kishimoto ............ G06F 3/0412
2020/0133414 A1*  4/2020 Lee ......................... G06F 3/044
(Continued)

FOREIGN PATENT DOCUMENTS

CN      111599846 A    8/2020
JP    2021-039342 A    3/2021
(Continued)

OTHER PUBLICATIONS

OLED display incorporating organic photodiodes for fingerprint imaging, Taisuke Kamada et al., Journal of the Society for Information Display, p. 361-371, Apr. 15, 2021.

*Primary Examiner* — Nduka E Ojeh
(74) *Attorney, Agent, or Firm* — Innovation Counsel LLP

(57) ABSTRACT

Provided is a display device including a base layer on which a pixel region, a sensor region, and a peripheral region adjacent to the pixel region and the sensor region are defined, an element layer including a light emitting element having a light emitting layer disposed in the pixel region, and including a light sensing element having a photoelectric conversion layer disposed in the sensor region, a light blocking pattern disposed on the element layer and overlapping a portion of the peripheral region, and an optical pattern disposed on the light blocking pattern, wherein at least a portion of the optical pattern overlaps the photoelectric conversion layer on a plane. Accordingly, the display device of an embodiment may sense the biometric information of a user more precisely.

20 Claims, 11 Drawing Sheets

(51) Int. Cl.
H10K 50/86 (2023.01)
H10K 59/122 (2023.01)
H10K 59/38 (2023.01)

(56) References Cited

U.S. PATENT DOCUMENTS

| | | | |
|---|---|---|---|
| 2020/0201481 A1* | 6/2020 | Lee | G06F 3/0446 |
| 2020/0313101 A1* | 10/2020 | Jung | H10K 59/87 |
| 2020/0380239 A1 | 12/2020 | Lee et al. | |
| 2021/0066669 A1* | 3/2021 | Kubota | H10K 59/65 |
| 2021/0327979 A1 | 10/2021 | Kamada et al. | |
| 2021/0376003 A1* | 12/2021 | Xu | H10K 59/8792 |
| 2022/0067340 A1* | 3/2022 | Han | G06F 3/042 |
| 2023/0260318 A1* | 8/2023 | Lu | G06V 40/1318 |
| | | | 382/124 |

FOREIGN PATENT DOCUMENTS

| | | | |
|---|---|---|---|
| KR | 10-2020-0137081 A | 12/2020 | |
| WO | 2020053692 A1 | 3/2020 | |

\* cited by examiner

DISPLAY DEVICE INCLUDING AN OPTICAL PATTERN

CROSS-REFERENCE TO RELATED APPLICATIONS

This U.S. non-provisional patent application claims priority under 35 U.S.C. § 119 of Korean Patent Application No. 10-2021-0132909, filed on Oct. 7, 2021, the entire contents of which are hereby incorporated by reference.

BACKGROUND

1. Field

The present disclosure herein generally relates to a display device, and more particularly, to a display device capable of precise biometric information recognition.

2. Description of the Related Art

A display device provides a variety of functions for allowing organic communication with a user, such as displaying an image to provide information to the user or sensing an input by the user. Recently, display devices include a function for sensing the user's biometric information.

As a method for recognizing biometric information, there are methods such as a capacitance method which senses changes in capacitance formed between electrodes, an optical method which senses incident light using an optical sensor, and an ultrasonic method which senses vibration using a piezoelectric body and the like.

SUMMARY

The present disclosure provides a display device including a display panel equipped with a sensor for biometric information recognition.

An embodiment of the present disclosure provides a display device including a base layer on which a pixel region, a sensor region, and a peripheral region adjacent to the pixel region and the sensor region are defined, an element layer including a light emitting element having a light emitting layer disposed in the pixel region, and including a light sensing element having a photoelectric conversion layer disposed in the sensor region, a light blocking pattern disposed on the element layer and overlapping a portion of the peripheral region, and an optical pattern disposed on the light blocking pattern, wherein at least a portion of the optical pattern overlaps the photoelectric conversion layer on a plane.

In an embodiment, the light blocking pattern may not overlap the photoelectric conversion layer on a plane.

In an embodiment, the light blocking pattern and the optical pattern may include a light blocking material.

In an embodiment, the display device may further include a color filter layer disposed on the element layer and including a plurality of color filter units, wherein the light blocking pattern may overlap an edge of each of the plurality of color filter units.

In an embodiment, the color filter layer may further include an overcoat layer covering the plurality of color filter units, wherein the optical pattern may be disposed on the overcoat layer.

In an embodiment, the display device may further include an additional organic layer disposed on the overcoat layer, wherein the optical pattern may be disposed on an upper surface of the additional organic layer.

In an embodiment, the display device may further include an organic planarization layer disposed on the optical pattern and covering the optical pattern.

In an embodiment, the element layer may include a pixel definition film on which an opening is defined, and the light emitting layer and the photoelectric conversion layer may be disposed inside of the opening of the pixel definition film.

In an embodiment, the peripheral region may include a non-sensor region adjacent to the sensor region, and the optical pattern may overlap the non-sensor region.

In an embodiment, the light blocking pattern may include a first sub-light blocking pattern and a second sub-light blocking pattern which at least partially overlap the optical pattern, and on a cross-section, a separation distance between the first sub-light blocking pattern and the second sub-light blocking pattern may be larger than a width of the sensor region.

In an embodiment, the optical pattern may overlap the light sensing element on a plane and include a first sub-optical pattern and a second sub-optical pattern spaced apart from the first sub-optical pattern, and on a cross-section, a separation distance between the first sub-optical pattern and the second sub-optical pattern may be smaller than the width of the sensor region.

In an embodiment, the first sub-light blocking pattern may include a light blocking inner surface overlapping the non-sensor region and a light blocking outer surface facing the light blocking inner surface, the first sub-light blocking pattern may include an optical inner surface overlapping the sensor region and an optical outer surface facing the optical inner surface, and the optical outer surface may be disposed more adjacent to the sensor region than the light blocking outer surface.

In an embodiment, the light blocking pattern may not overlap the non-sensor region.

In an embodiment, the display device may further include a window disposed on the optical pattern, wherein a sensing region of the light sensing element may be defined on an upper surface of the window.

In an embodiment, the display device may further include an input sensing layer disposed between the element layer and the light blocking pattern.

In an embodiment, the light emitting element may be an organic light emitting diode, and the light sensing element may be an organic photodiode.

In an embodiment of the present disclosure, a display device includes a base layer on which a pixel region, a sensor region, and a peripheral region adjacent to the pixel region and the sensor region are defined, an element layer including a light emitting element disposed in the pixel region and a light sensing element disposed in the sensor region, a color filter layer disposed on the element layer, an optical pattern disposed on the color filter layer, and a window disposed on the optical pattern, wherein a distance from an upper surface of the optical pattern to an upper surface of the window is smaller than a distance from the upper surface of the color filter layer to an upper surface of the window.

In an embodiment, the light sensing element may include an anode disposed on the base layer, a photoelectric conversion layer disposed on the anode, and a cathode disposed on the photoelectric conversion layer, and wherein at least a portion of the optical pattern may overlap the photoelectric conversion layer on a plane.

In an embodiment, the color filter layer may include a plurality of color filter units, a light blocking pattern overlapping an edge of each of the plurality of color filter units, and an overcoat layer covering the plurality of color filter units, wherein the optical pattern may be disposed on the overcoat layer.

In an embodiment of the present disclosure, a display device includes a pixel region, a sensor region, and a peripheral region adjacent to the pixel region and the sensor region. In an embodiment of the present disclosure, the display device includes an element layer including a light emitting element having a light emitting layer disposed in the pixel region, and including a light sensing element having a photoelectric conversion layer disposed in the sensor region, a color filter layer disposed on the element layer, and including a light blocking pattern which overlaps a portion of the peripheral region, an optical layer including an optical pattern disposed on the light blocking pattern, and a window disposed on the optical layer, wherein at least a portion of the optical pattern overlaps the photoelectric conversion layer on a plane.

BRIEF DESCRIPTION OF THE DRAWINGS

The accompanying drawings are included to provide a further understanding of the present disclosure, and are incorporated in and constitute a part of this specification. The drawings illustrate example embodiments of the present disclosure and, together with the description, serve to explain principles of the present disclosure. In the drawings:

FIG. 8A is a schematic view schematically showing some components of a display device according to an embodiment of the present disclosure; and FIG. 8B is a schematic view schematically showing some components of a display device according to a comparative example.

DETAILED DESCRIPTION

Figure 1:
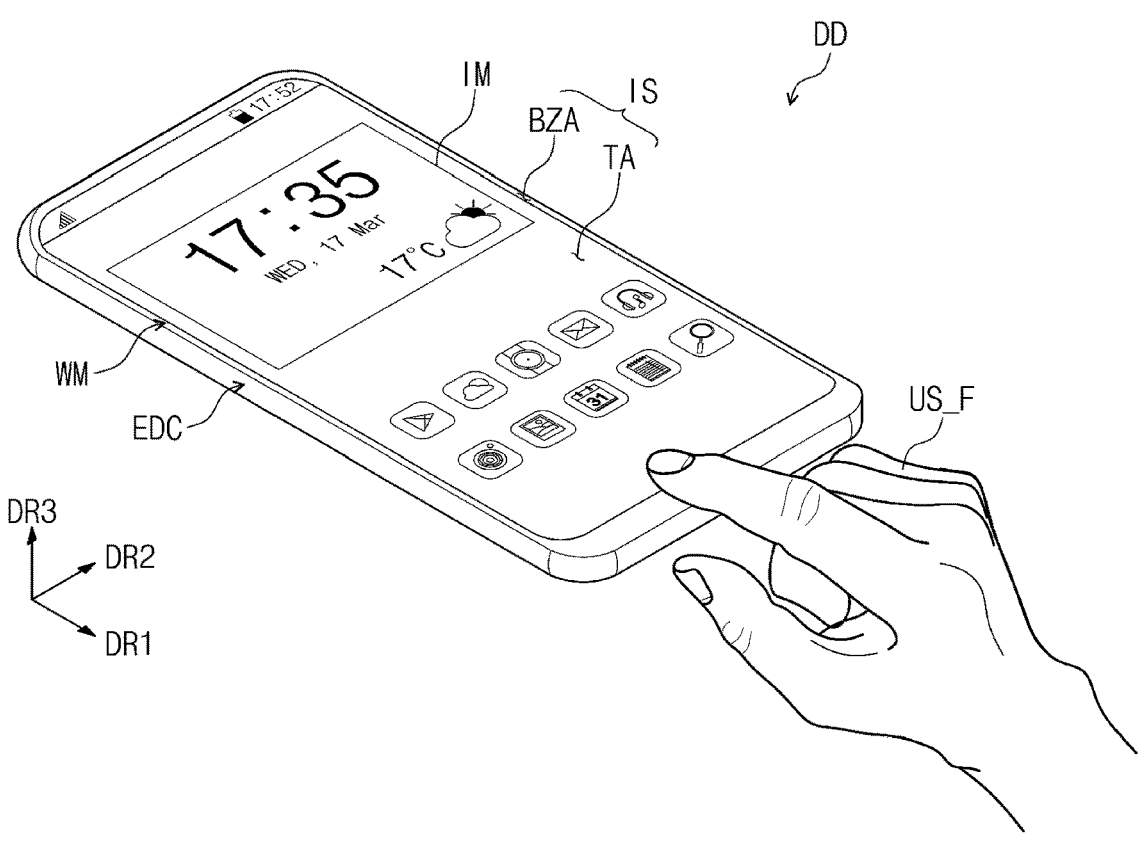
FIG. 1 is a perspective view of a display device according to an embodiment of the present disclosure.

Hereinafter, embodiments of the present disclosure will be described with reference to the accompanying drawings.

In the present disclosure, when an element (or an area, a layer, a portion, etc.) is referred to as being "on," "connected to," or "coupled to" another element, it means that the element may be directly connected to/coupled to the other element, or that a third element may be disposed therebetween.

Like reference numerals refer to like elements. Also, in the drawings, the thickness, the ratio, and the dimensions of elements are exaggerated for an effective description of technical contents. The term "and/or" includes any and all combinations of one or more of which associated elements may define.

It will be understood that, although the terms "first," "second," etc. may be used herein to describe various elements, these elements should not be limited by these terms. These terms are only used to distinguish one element from another. For example, a first element may be referred to as a second element, and a second element may also be referred to as a first element in a similar manner without departing the scope of rights of the present invention. The terms of a singular form may include plural forms unless the context clearly indicates otherwise.

In addition, terms such as "below," "lower," "above," "upper," and the like are used to describe the relationship of components shown in the drawings. The terms are used as a relative concept and are described with reference to the direction indicated in the drawings.

It should be understood that the terms "comprise," or "have" are intended to specify the presence of stated features, integers, steps, operations, elements, components, or combinations thereof in the disclosure, but do not preclude the presence or addition of one or more other features, integers, steps, operations, elements, components, or combinations thereof.

In the present disclosure, being "directly disposed" may mean that there is no layer, film, region, plate, or the like added between a portion of a layer, a film, a region, a plate, or the like and other portions. For example, being "directly disposed" may mean being disposed without additional members such as an adhesive member between two layers or two members.

Unless otherwise defined, all terms (including technical and scientific terms) used herein have the same meaning as commonly understood by one of ordinary skill in the art to which the present invention pertains. It is also to be understood that terms such as terms defined in commonly used dictionaries should be interpreted as having meanings consistent with the meanings in the context of the related art, and should not be interpreted in too ideal a sense or an overly formal sense unless explicitly defined herein.

Hereinafter, a display panel according to an embodiment of the present disclosure and a manufacturing method thereof will be described with reference to the accompanying drawings.

Figure 2:
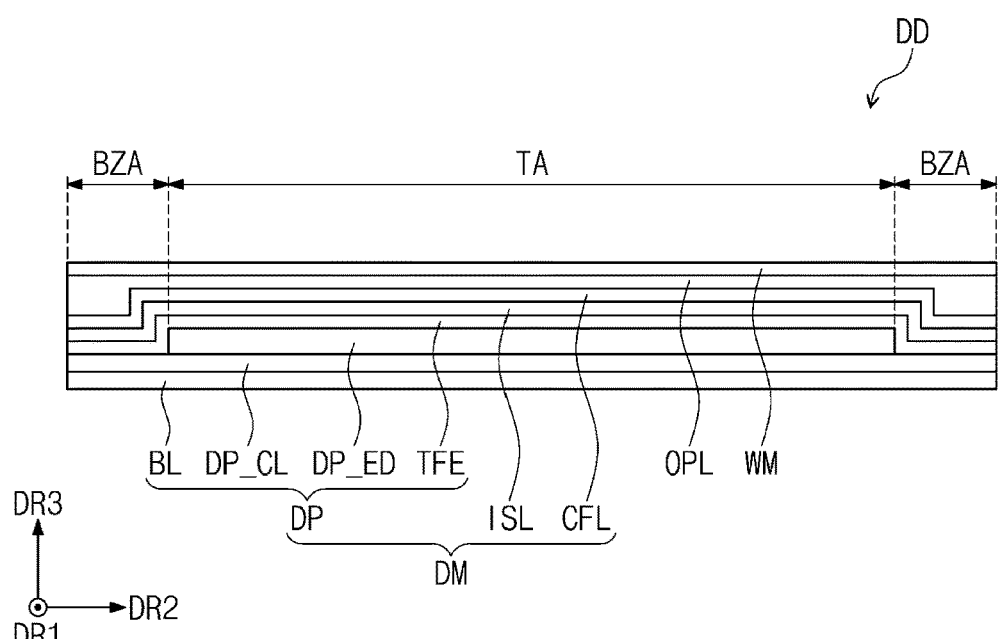
FIG. 2 is a cross-sectional view of a display device according to an embodiment of the present disclosure.

FIG. 1 is a perspective view of a display device according to an embodiment of the present disclosure, and FIG. 2 is a cross-sectional view of a display device according to an embodiment of the present disclosure.

Referring to FIG. 1 and FIG. 2, a display device DD according to an embodiment of the present disclosure may have a rectangular shape which has long sides parallel to a first direction DR1 and short sides parallel to a second direction DR2 which crosses the first direction DR1. However, the embodiment of the present disclosure is not limited thereto. The display device DD may have various shapes such as a circular shape and a polygonal shape.

The display device DD may be a device activated by an electrical signal. The display device DD may include various embodiments. For example, the display device DD may be applied to an electronic apparatus such as a smart watch, a tablet computer, a laptop, a desktop, a smart television, and the like.

Hereinafter, a direction substantially perpendicular to a plane defined by the first direction DR1 and the second direction DR2 is defined as a third direction DR3. In the present disclosure "when viewed on a plane" may mean when viewed in the third direction DR3.

The upper surface of the display device DD may be defined as a display surface IS, and may have a plane defined by the first direction DR1 and the second direction DR2. Images IM generated in the display device DD may be provided to a user through the display surface IS.

The display surface IS may be divided into a transmissive region TA and a bezel region BZA. The transmissive region TA may be a region on which the images IM are displayed. The user visually recognizes the images IM through the transmissive region TA. In the present embodiment, the transmissive region TA is illustrated as a quadrangular shape having rounded vertices. However, this is only example. The transmissive region TA may have various shapes, and is not limited to any one embodiment.

The bezel region BZA is adjacent to the transmissive region TA. The bezel region BZA may have a predetermined color. The bezel region BZA may surround the transmissive region TA. Accordingly, the shape of the transmissive region TA may be substantially defined by the bezel region BZA. However, this is only an example. The bezel region BZA may be disposed adjacent to only one side of the transmissive region TA, or may be omitted.

The display device DD may sense an external input applied from the outside. The external input may include various forms of inputs provided from the outside of the display device DD. For example, the external input may include not only a contact by a part of a body, such as a user's hand US_F, but also an external input applied in close proximity, or adjacent to the display device DD at a predetermined distance (for example, hovering). In addition, the external input may have various forms such as force, pressure, temperature, light, and the like.

The display device DD may sense a user's biometric information applied from the outside. The display surface IS of the display device DD may be provided with a biometric information sensing region which may sense the user's biometric information. The biometric information sensing region may be provided in the entire region of the transmissive region TA, or may be provided in some regions of the transmissive region TA. FIG. 1 illustrates that the entire transmissive region TA is utilized as the biometric information sensing region, but the embodiment of the present disclosure is not limited thereto. The biometric information sensing region may be provided in a portion of the transmissive region TA.

The display device DD may include a window WM, a display module DM, and a housing EDC. In the present embodiment, the window WM and the housing EDC are bonded to constitute the appearance of the display device DD.

The front surface of the window WM defines the display surface IS of the display device DD. The window WM may include an optically transparent insulation material. For example, the window WM may include glass or plastic. The window WM may have a multi-layered structure or a single-layered structure. For example, the window WM may include a plurality of plastic films bonded using an adhesive, or a glass substrate and a plastic film bonded using an adhesive.

The display module DM may include a display panel DP and an input sensing layer ISL. The display panel DP displays an image in accordance with an electrical signal, and the input sensing layer ISL may sense an external input applied from the outside. The external input applied from the outside may be provided in various forms.

The display panel DP according to an embodiment of the present disclosure may be a light emitting type display panel, but is not particularly limited thereto. For example, the display panel DP may be an organic light emitting display panel, an inorganic light emitting display panel, or a quantum dot light emitting display panel. A light emitting layer of the organic light emitting display panel may include an organic light emitting material, and a light emitting layer of the inorganic light emitting display panel may include an inorganic light emitting material. A light emitting layer of the quantum dot light emitting display panel may include a quantum dot, a quantum load, and the like. Hereinafter, the display panel DP is described as an organic light emitting display panel.

Referring to FIG. 2, the display panel DP includes a base layer BL, a circuit layer DP_CL, an element layer DP_ED, and an encapsulation layer TFE. The display panel DP according to the present disclosure may be a flexible display panel. However, the embodiment of the present disclosure is not limited thereto. For example, the display panel DP may be a foldable display panel which is folded around a folding axis, or a rigid display panel.

The base layer BL may include a synthetic resin layer. The synthetic resin layer may be a polyimide-based resin layer, and the material thereof is not particularly limited. In addition, the base layer BL may include a glass substrate, a metal substrate, an organic/inorganic composite material substrate, or the like.

The circuit layer DP_CL is disposed on the base layer BL. The circuit layer DP_CL includes at least one insulation layer and a circuit element. Hereinafter, an insulation layer included in the circuit layer DP_CL is referred to as an intermediate insulation layer. The intermediate insulation layer includes at least one intermediate inorganic film and at least one intermediate organic film. The circuit element may include a pixel driving circuit included in each of a plurality of pixels for displaying an image, a sensor driving circuit included in each of a plurality of sensors for recognizing external information, and the like. The external information may be biometric information. As an example of the present disclosure, a sensor may be a fingerprint recognition sensor, a proximity sensor, an iris recognition sensor, or the like. In addition, the sensor may be an optical sensor which recognizes biometric information in an optical manner. The circuit layer DP_CL may further include signal lines connected to the pixel driving circuit and the sensor driving circuit.

The element layer DP_ED may include a light emitting element included in each of the pixels and a light sensing element included in each of the sensors. As an example of the present disclosure, the light sensing element may be a photodiode. An optical fingerprint sensor may sense light reflected by a user's fingerprint. The circuit layer DP_CL and the element layer DP_ED will be described in detail later with reference to FIG. 5, and FIG. 6A to FIG. 6C.

The encapsulation layer TFE encapsulates the element layer DP_ED. The encapsulation layer TFE may include at least one organic film and at least one inorganic film. The inorganic film may include an inorganic material, and may protect the element layer DP_ED from moisture/oxygen. The inorganic film may include a silicon nitride layer, a silicon oxynitride layer, a silicon oxide layer, a titanium oxide layer, an aluminum oxide layer, or the like, but is not particularly limited thereto. The organic layer may include an organic material, and may protect the element layer DP_ED from foreign substances such as dust particles.

On the display panel DP, the input sensing layer ISL may be formed. The input sensing layer ISL may be directly disposed on the encapsulation layer TFE. According to an embodiment of the present disclosure, the input sensing layer ISL may be formed on the display panel DP by a continuous process. That is, when the input sensing layer ISL is directly disposed on the display panel DP, an adhesive film is not disposed between the input sensing layer ISL and the encapsulation layer TFE. However, alternatively, an internal adhesive film may be disposed between the input sensing layer ISL and the display panel DP. In this case, the input sensing layer ISL is not manufactured by a continuous process with the display panel DP, but may be manufactured through a process separate from that of the display panel DP, and then fixed on the upper surface of the display panel DP by the internal adhesive film.

The input sensing layer ISL may sense an external input (e.g., a user's touch US_F) and change the same into a predetermined input signal, and may provide the input signal to the display panel DP. The input sensing layer ISL may include a plurality of sensing electrodes for sensing an external input. The sensing electrodes may sense the external input in an electrostatic capacitive manner. The display panel DP may be provided with an input signal from the input sensing layer ISL, and may generate an image corresponding to the input signal.

The display module may further include a color filter layer CFL. As an example of the present disclosure, the color filter layer CFL may be disposed on the input sensing layer ISL. However, the embodiment of the present disclosure is not limited thereto. The color filter layer CFL may be disposed between the display panel DP and the input sensing layer ISL. The color filter layer CFL may include a plurality of color filter units and a light blocking pattern.

The display device DD according to an embodiment of the present disclosure further includes an optical layer OPL disposed on the color filter layer CFL. The optical layer OPL includes an optical pattern, and thus, may reduce the sensing region of a light sensing element to improve sensing precision. Hereinafter, details on the structures of the input sensing layer ISL, the color filter layer CFL, and the optical layer OPL will be described later.

Although not illustrated, the display device DD may further include an adhesive layer disposed between the optical layer OPL and the window WM. The window WM may be attached to the optical layer OPL and the like by the adhesive layer. The adhesive layer may include an optical clear adhesive, an optically clear adhesive resin, or a pressure sensitive adhesive (PSA).

The housing EDC is attached to the window WM. The housing EDC is bonded to the window WM and provides a predetermined internal space. The display module DM may be received in the internal space. The housing EDC may include a material having relatively high rigidity. For example, the housing EDC may include glass, plastic, or a metal, or may include a plurality of frames and/or plates composed of a combination thereof. The housing EDC may stably protect components of the display device DD received in the internal space from an external impact. Although not illustrated, a battery module which supplies power required for the overall operation of the display device DD, and the like, may be disposed between the display module DM and the housing EDC.

Figure 3:
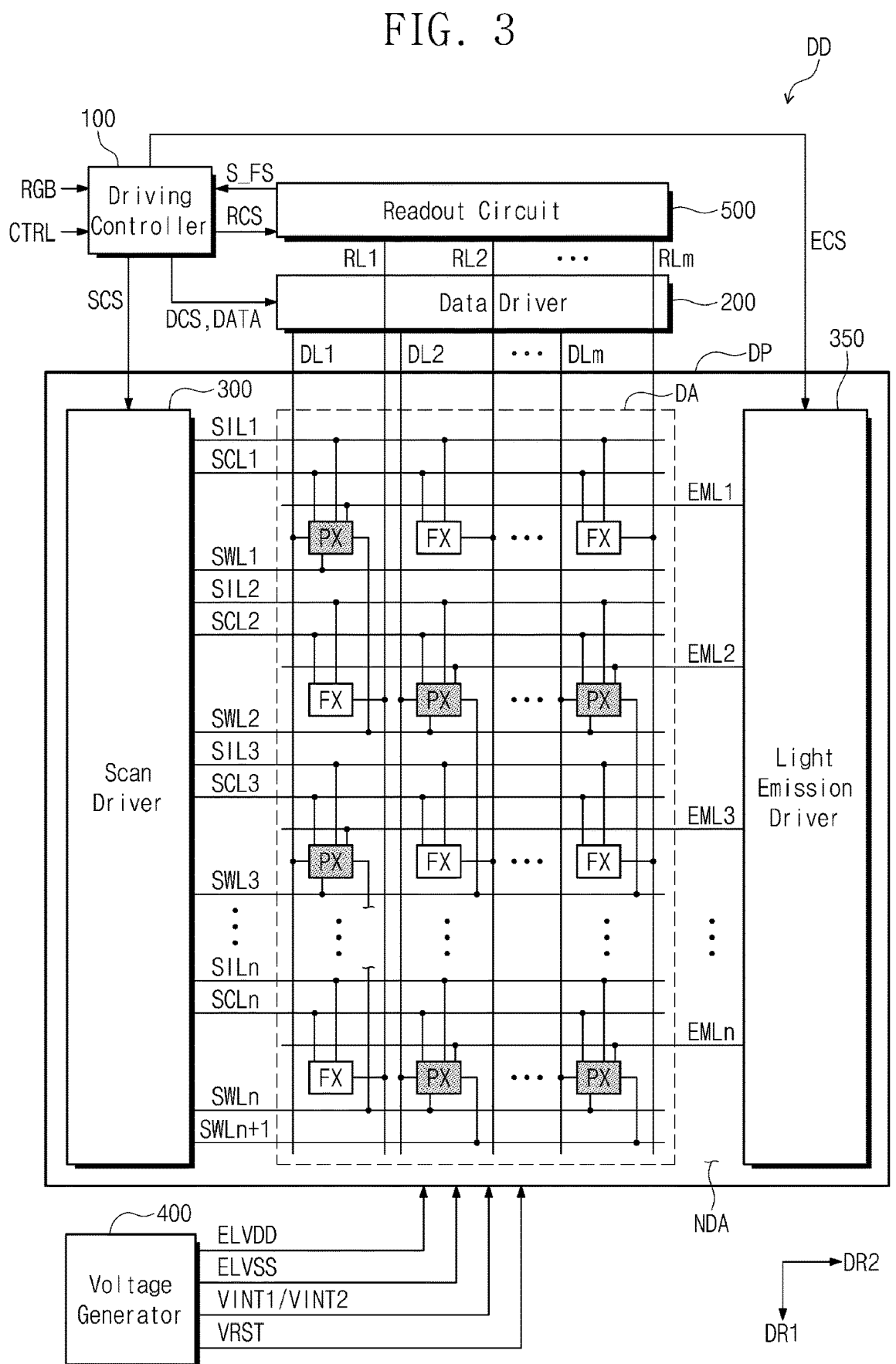
FIG. 3 is a block diagram of a display device according to an embodiment of the present disclosure.
Figure 4A:
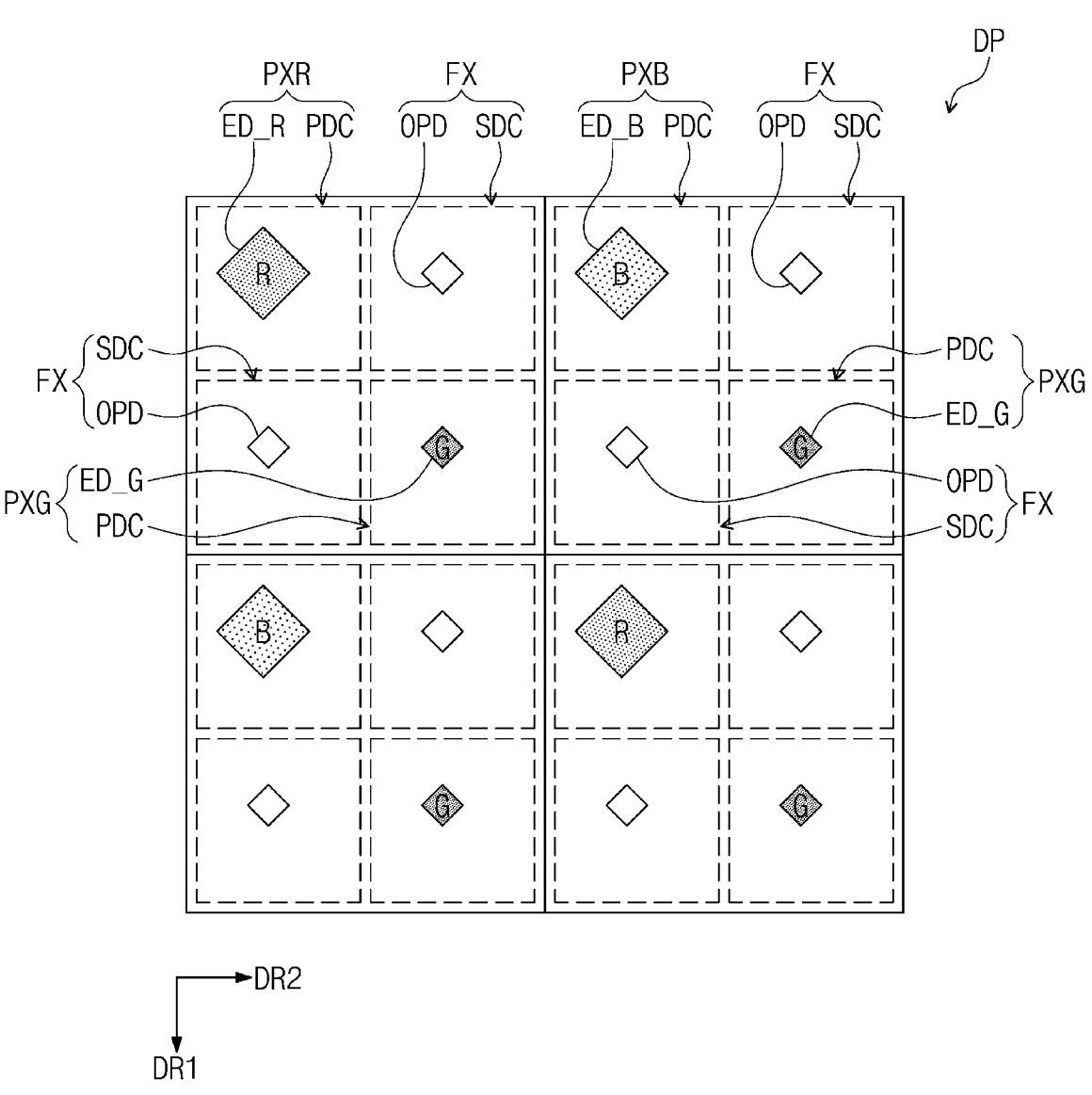
FIG. 4A and FIG. 4B are plan views of some enlarged regions of a display panel according to embodiments of the present disclosure.
Figure 4B:
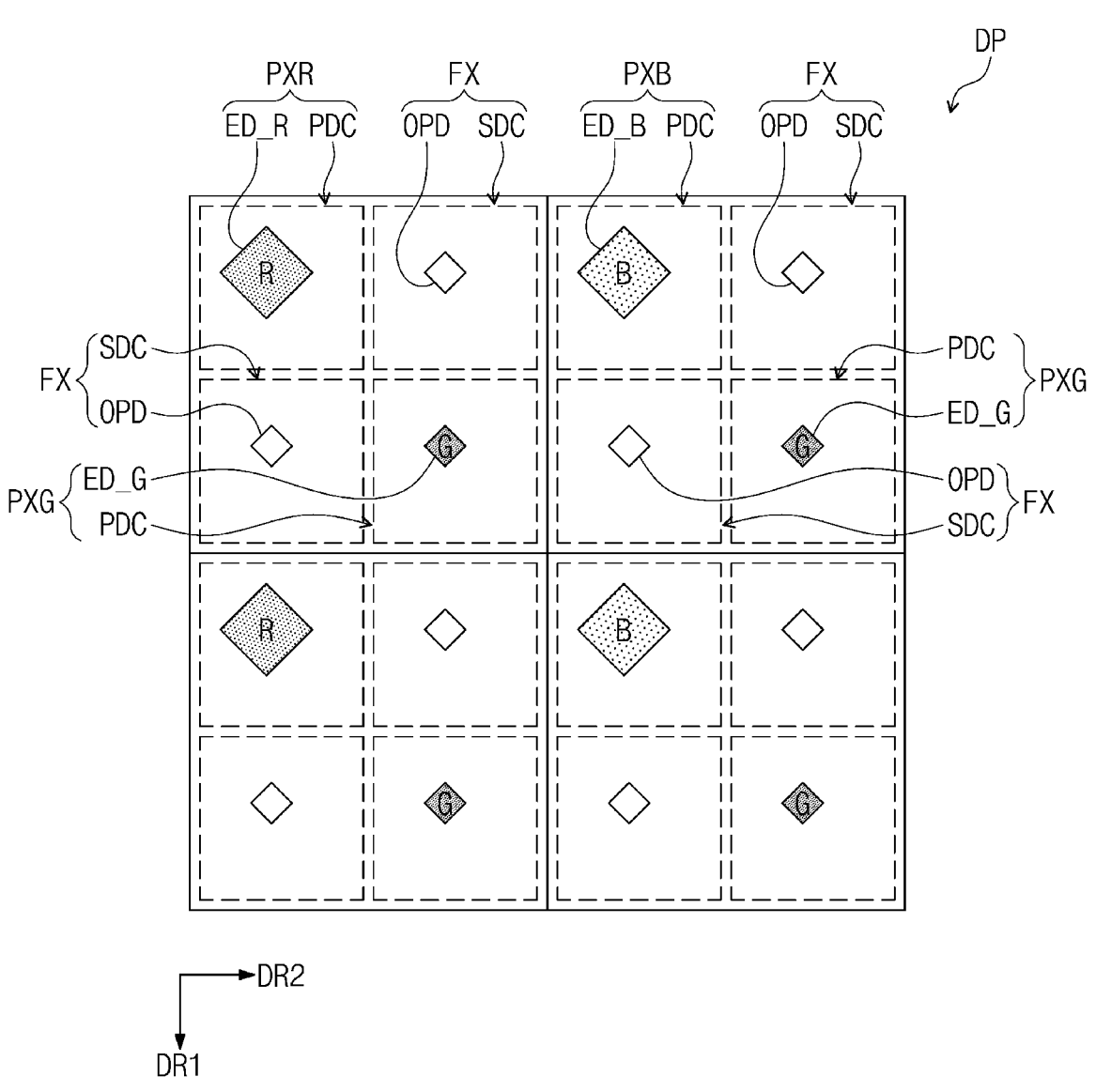

FIG. 3 is a block diagram of a display device according to an embodiment of the present disclosure, and FIG. 4A and FIG. 4B are plan views of some enlarged regions of a display panel according to embodiments of the present disclosure.

Referring to FIG. 3, the display device DD includes the display panel DP, a panel driver, and a driving controller 100. As an example of the present disclosure, the panel driver includes a data driver 200, a scan driver 300, a light emission driver 350, a voltage generator 500, and a readout circuit 500.

The driving controller 100 receives an image signal RGB and a control signal CTRL. The driving controller 100 generates an image data signal DATA obtained by converting the data format of the image signal RGB to meet the interface specifications of the data driver 200. The driving controller 100 outputs a first control signal SCS, a second control signal ECS, a third control signal DCS, and a fourth control signal RCS.

The data driver 200 receives the third control signal DCS and the image data signal DATA from the driving controller 100. The data driver 200 converts the image data signal DATA into data signals, and outputs the data signals to a plurality of data lines DL1 to DLm to be described later. The data signals are analog voltages corresponding to gray scale values of the image data signal DATA.

The scan driver 300 receives the first control signal SCS from the driving controller 100. The scan driver 300 may output scan signals to scan lines in response to the first control signal SCS.

The voltage generator 400 generates voltages required for the operation of the display panel DP. In this embodiment, the voltage generator 400 generates a first driving voltage ELVDD, a second driving voltage ELVSS, a first initialization voltage VINT1, a second initial initialization voltage VINT2, and a reset voltage VRST.

The display panel DP may include a display region DA corresponding to the transmissive region TA (see FIG. 1) and a non-display region NDA corresponding to the bezel region BZA (see FIG. 1).

The display panel DP may include a plurality of pixels PX disposed in the display region DA and a plurality of sensors FX disposed in the display region DA. As an example of the present disclosure, each of the plurality of sensors FX may be disposed between two pixels PX adjacent to each other. The plurality of pixels PX and the plurality of sensors FX may be alternately disposed on the first and second directions DR1 and DR2.

The display panel DP further includes initialization scan lines SIL1 to SILn, compensation scan lines SCL1 to SCLn, write scan lines SWL1 to SWLn+1, light emission control lines EML1 to EMLn, data lines DL1 to DLm, and readout lines RL1 to RLm. The initialization scan lines SIL1 to SILn, the compensation scan lines SCL1 to SCLn, the write scan lines SWL1 to SWLn+1, and the light emission control lines EML1 to EMLn are extended in the second direction DR2. The initialization scan lines SIL1 to SILn, the compensation scan lines SCL1 to SCLn, the write scan lines SWL1 to SWLn, and the light emission control lines EML1 to EMLn are arranged spaced apart from each other in the first direction DR1. The data lines DL1 to DLm and the readout lines RL1 to RLm are extended in the first direction DR1, and arranged spaced apart from each other in the second direction DR2.

The plurality of pixels PX are electrically connected to the initialization scan lines SIL1 to SILn, the compensation scan lines SCL1 to SCLn, the write scan lines SWL1 to SWLn+1, the light emission control lines EML1 to EMLn, and the data lines DL1 to DLm, respectively. Each of the plurality of pixels PX may be electrically connected to 4 scan lines. For example, as illustrated in FIG. 3, pixels PX in the first row may be connected to a first initialization scan line SIL1, a first compensation scan line SCL1, and first and second write scan lines SWL1 and SWL1. In addition, pixels PX in the second row may be connected to a second initialization scan line SIL2, a second compensation scan line SCL2, and second and third write scan lines SWL2 and SWL3.

The plurality of sensors FX are electrically connected to the initialization scan lines SIL1 to SILn, the compensation scan lines SCL1 to SCLn, and the readout lines RL1 to RLm, respectively. Each of the plurality of sensors FX may be electrically connected to two scan lines. For example, as illustrated in FIG. 3, sensors FX in the first row may be connected to the first initialization scan line SIL1 and the first compensation scan line SCL1. In addition, sensors FX in the second row may be connected to the second initialization scan line SIL2 and the second compensation scan line SCL2.

The scan driver 300 may be disposed in the non-display region NDA of the display panel DP. The scan driver 300 receives the first control signal SCS from the driving controller 100. The first control signal SCS may include a start signal and a plurality of clock signals. The scan driver 300 may output initialization scan signals to the initialization scan lines SIL1 to SILn, output compensation scan signals to the compensation scan lines SCL1 to SCLn, and output write scan signals to the write scan lines SWL1 to SWLn+1 in response to the first control signal SCS.

The light emission driver 350 may be disposed in the non-display region NDA of the display panel DP. The light emission driver 350 receives the second control signal ECS from the driving controller 100. The light emission driver 350 may output light emission control signals to the light emission control lines EML1 to EMLn in response to the second control signal ECS. Alternatively, the scan driver 300 may be connected to the light emission control lines EML1 to EMLn. In this case, the scan driver 300 may output the light emission control signals to the light emission control lines EML1 to EMLn.

The readout circuit 500 receives the fourth control signal RCS from the driving controller 100. The readout circuit 500 may receive sensing signals from the readout lines RL1 to RLm in response to the fourth control signal RCS. The readout circuit 500 may process the sensing signals received from the readout lines RL1 to RLm, and may provide the processed sensing signals S_FS to the driving controller 100. The driving controller 100 may recognize biometric information on the basis of the sensing signals S_FS.

As illustrated in FIG. 4A and FIG. 4B, the display panel DP includes pixels PXR, PXG, and PXB and the sensors FX. Each of the pixels PXR, PXG, and PXB includes light emitting elements ED_R, ED_G, and ED_B and a pixel driving circuit PDC. Each of the sensors FX includes a light sensing element OPD and a sensor driving circuit SDC.

The pixels PXR, PXG, and PXB and the sensors FX are alternately disposed in the first direction DR1 and are alternately disposed in the second direction DR2. The pixels PXR, PXG, and PXB include first pixels PXR including a light emitting element (hereinafter, a first light emitting element ED_R) which outputs light of a first color (e.g., red (R)), second pixels PXG including a light emitting element (hereinafter, a second light emitting element ED_G) which outputs light of a second color (e.g., green (G)), and third pixels PXB including a light emitting element (hereinafter, a third light emitting element ED_B) which outputs light of a third color (e.g., blue (B)).

As illustrated in FIG. 4A, in each direction of the first direction DR1 and the second direction DR2, the first pixels PXR and the third pixels PXB may be alternately and repeatedly disposed. The second pixels PXG may be arranged along each of the first direction DR1 and the second direction DR2.

In each direction of the first direction DR1 and the second direction DR2, each of the sensors FX may be disposed between the first pixel PXR and the third pixel PXB adjacent to each other. In addition, in each direction of the first direction DR1 and the second direction DR2, each of the sensors FX may be disposed between two second pixels PXG. That is, for example, along the second direction DR2, the first pixel PXR and the third pixel PXB is spaced apart with respect to the sensor FX, and the second pixel PXG is disposed between two the sensors FX. In addition, along the first direction DR1, the first pixel PXR and the third pixel PXB is spaced apart with respect to the sensor FX, and the second pixel PXG is disposed between two sensors FX. However, the arrangement structures of the pixels PX and the sensors FX are not limited thereto.

As illustrated in FIG. 4B, on the first direction DR1, each of the sensors FX may be disposed between two first pixels PXR, two second pixels PXG, and two third pixels PXB. In addition, on the second direction DR2, each of the sensors FX may be disposed between the first pixel PXR and the third pixel PXB adjacent to each other, or between two second pixels PXG. That is, for example, along the second direction DR2, the first pixel PXR and the third pixel PXB is spaced apart with respect to the sensor FX, and the second pixel PXG is disposed between two sensors FX. In addition, along the first direction DR1, the sensor FX is disposed between two first pixels PXR or disposed between two third pixels PXB, and the third pixel PXB is disposed between two sensors FX. In addition, the arrangement structures of the pixels PX and the sensors FX may be modified in various ways.

For example, the first pixels PXR and the third pixels PXB may be disposed in different columns or in different rows. When the first pixels PXR are disposed in an odd-numbered column, the third pixels PXB may be disposed in an even-numbered column. When the first pixels PXR are disposed in an odd-numbered row, the third pixels PXB may be disposed in an even-numbered row. In this case, in each direction of the first direction DR1 and the second direction DR2, at least one second pixel PXG and at least one sensor FX may be disposed between two first pixels PXR adjacent to each other. In addition, in each direction of the first direction DR1 and the second direction DR2, at least one second pixel PXG and at least one sensor FX may be disposed between two third pixels PXB adjacent to each other.

As an example of the present disclosure, the first light emitting element ED_R may have a bigger size than the second light emitting element ED_G. In addition, the third light emitting element ED_B may have a size bigger than or equal to that of the first light emitting element ED_R. The size of each of the first to third light emitting elements ED_R, ED_G, and ED_B is not limited thereto, and may be variously modified and applied. For example, in another embodiment of the present disclosure, the first to third light emitting elements ED_R, ED_G, and ED_B may have the same size.

In addition, each of the first to third light emitting elements ED_R, ED_G, and ED_B is illustrated as having a quadrangular shape, but is not limited thereto. The shape of each of the first to third light emitting elements ED_R, ED_G, and ED_B may be modified in various shapes, such as polygonal, circular, oval, and the like. As another example, the shapes of the first to third light emitting elements ED-R, ED-G, and ED-B may be different from each other. That is, the second light emitting element ED_G may have a circular shape, and the first and third light emitting elements ED_R and ED_B may have quadrangular shapes.

The light sensing element OPD may have a size smaller than those of the first and third light emitting elements ED_R and ED_B. As an example of the present disclosure, the light sensing element OPD may have a size smaller than or equal to that of the second light emitting element ED_G. However, the size of the light sensing element OPD is not limited thereto, and may be variously modified and applied. The light sensing element OPD is exemplarily illustrated as having a quadrangular shape, but is not limited thereto. The shape of the light sensing element OPD may be modified in various shapes, such as polygonal, circular, oval, and the like.

Each of the first to third light emitting elements ED_R, ED_G, and ED_B is electrically connected to a corresponding pixel driving circuit PDC. The pixel driving circuit PDC may include a plurality of transistors and a capacitor. Pixel driving circuits PDC connected to each of the first to third light emitting elements ED_R, ED_G, and ED_B may have the same circuit configuration.

The light sensing element OPD is electrically connected to a corresponding sensor driving circuit SDC. The sensor driving circuit SDC may include a plurality of transistors. As an example of the present disclosure, the sensor driving circuit SDC and the pixel driving circuit PDC may be simultaneously formed through the same process. In addition, the scan driver 300 may include transistors formed through the same process as that of the pixel driving circuit PDC and the sensor driving circuit SDC.

The pixel driving circuit PDC receives the first driving voltage ELVDD, the second driving voltage ELVSS, and the first and second initialization voltages VINT1 and VINT2 from the voltage generator 400. The sensor driving circuit SDC receives the first driving voltage ELVDD, the second driving voltage ELVSS, and the reset voltage VRST from the voltage generator 400.

Figure 5:
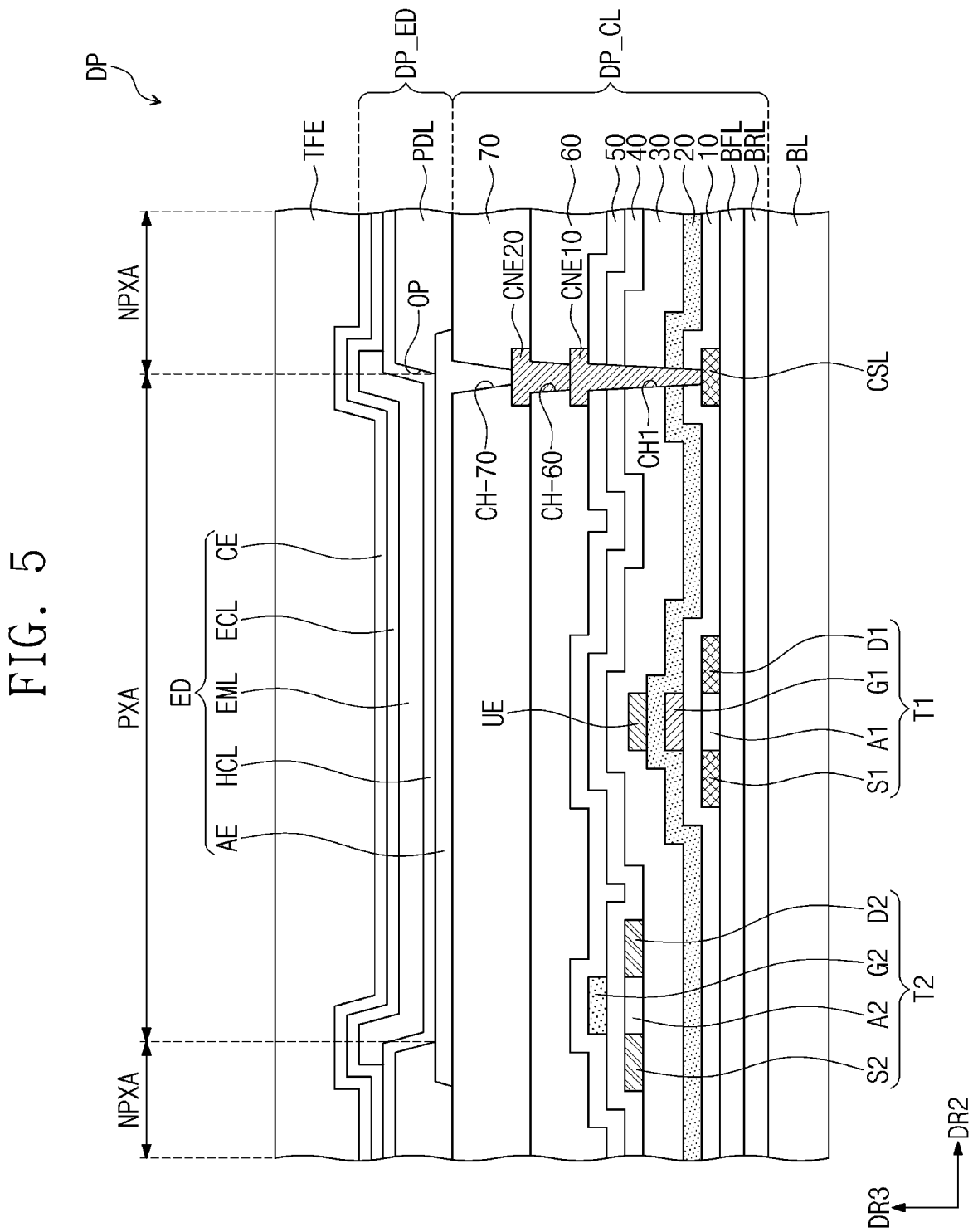
FIG. 5 is a cross-sectional view showing a pixel of a display panel according to an embodiment of the present disclosure.
Figure 6A:
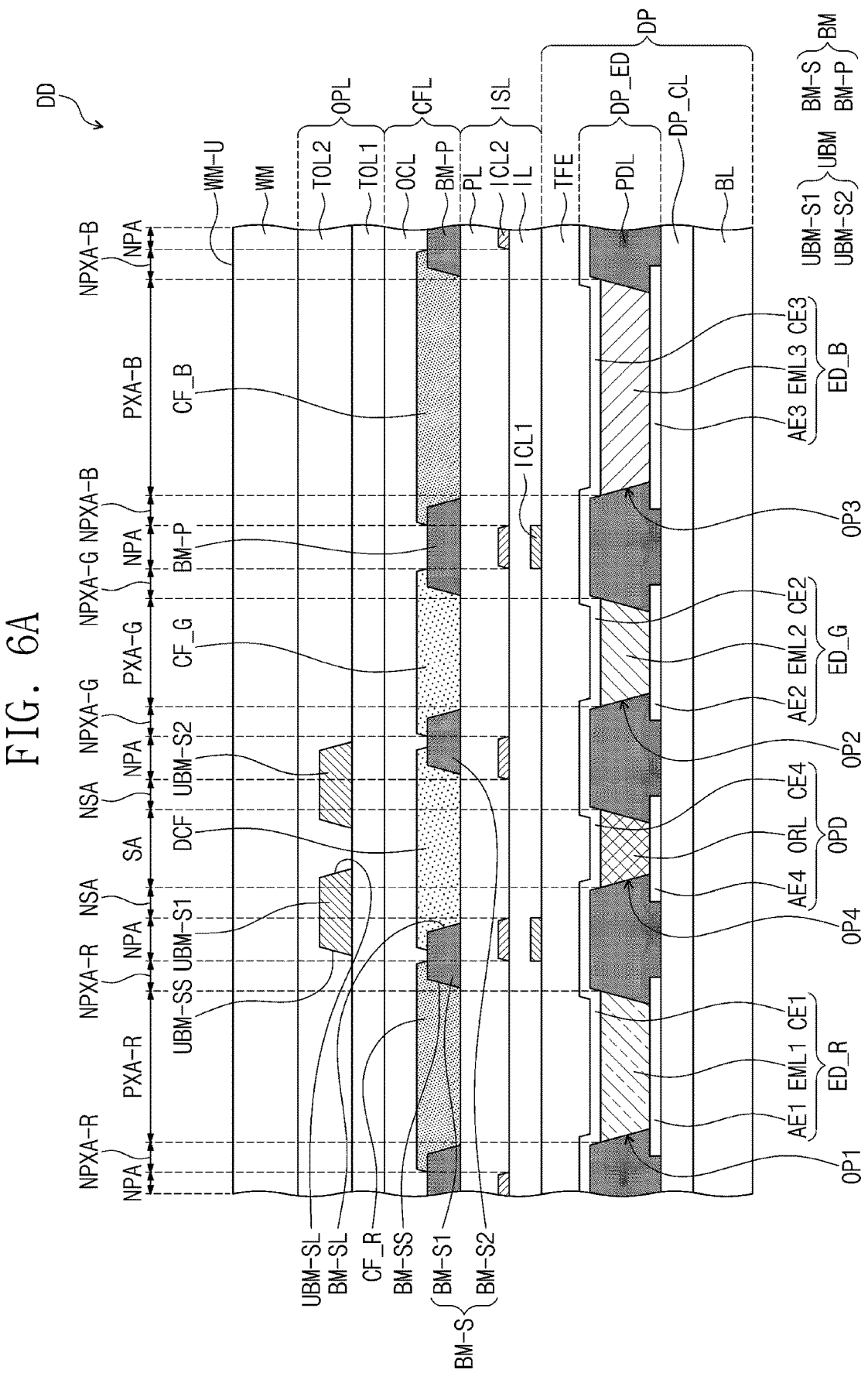
FIGS. 6A, 6B, and 6C are cross-sectional views showing a light emitting element and a light sensing element of a display panel according to an embodiment of the present disclosure.
Figure 6B:
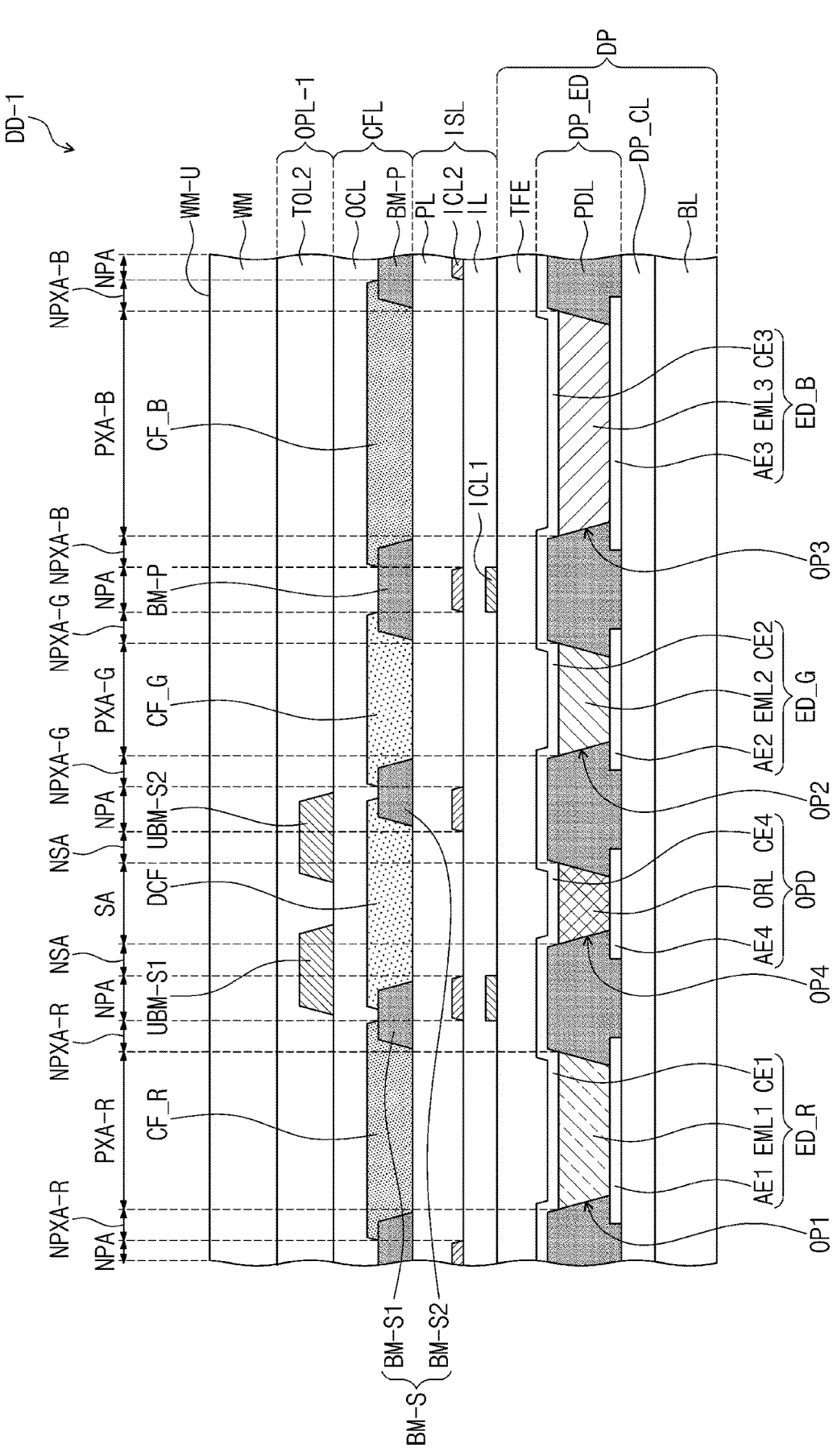
Figure 6C:
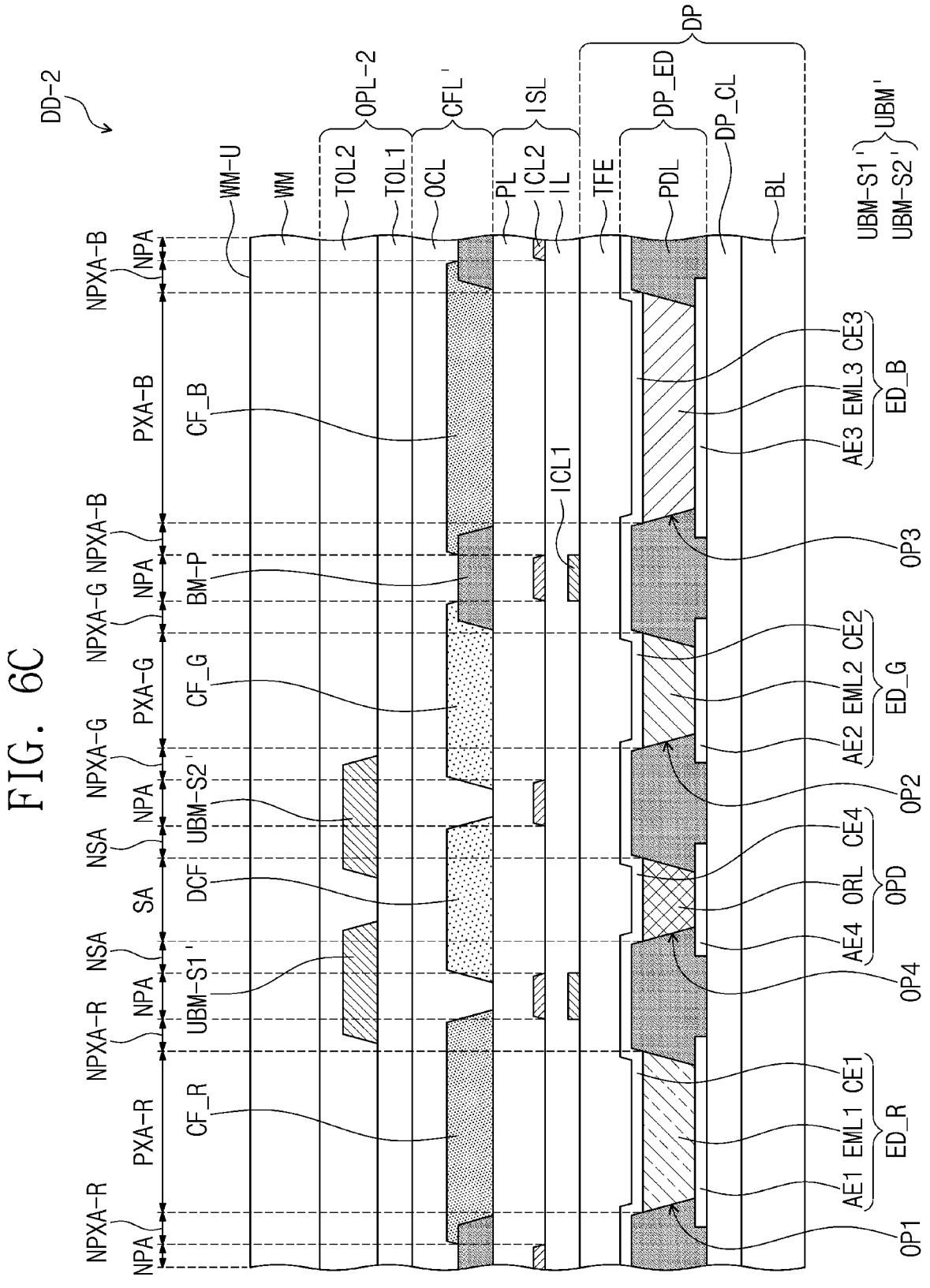

FIG. 5 is a cross-sectional view showing a pixel of a display panel according to an embodiment of the present disclosure. FIGS. 6A, 6B, and 6C are cross-sectional views showing a light emitting element and a light sensing element of a display panel according to an embodiment of the present disclosure.

Referring to FIG. 5 and FIG. 6A, the display panel DP may include the base layer BL, the circuit layer DP_CL disposed on the base layer BL, the element layer DP_ED, and the encapsulation layer TFE.

The base layer BL may include a synthetic resin layer. The synthetic resin layer may include a thermosetting resin. Particularly, the synthetic resin layer may be a polyimide-based resin layer, and the material thereof is not particularly limited. The synthetic resin layer may include at least any one of an acrylic resin, a methacrylic resin, polyisoprene, a vinyl-based resin, an epoxy-based resin, a urethane-based resin, a cellulose-based resin, a siloxane-based resin, a polyamide-based resin, or a perylene-based resin. In addition, the base layer may include a glass substrate, a metal substrate, an organic/inorganic composite substrate, or the like.

At least one inorganic layer is disposed on the upper surface of the base layer BL. The inorganic layer may include at least one of aluminum oxide, titanium oxide, silicon oxide, silicon oxynitride, zirconium oxide, or hafnium oxide. The inorganic layer may be formed of multiple layers. The multi-layered inorganic layers may constitute a barrier layer BRL and/or a buffer layer BFL to be described later. The barrier layer BRL and the buffer layer BFL may be selectively disposed.

The barrier layer BRL prevents foreign substances from being introduced from the outside. The barrier layer BRL may include a silicon oxide layer and a silicon nitride layer. Each of these may be provided in plurality, and silicon oxide layers and silicon nitride layers may be alternately stacked.

The buffer layer BFL may be disposed on the barrier layer BRL. The buffer layer BFL improves the bonding force between the base layer BL and a semiconductor pattern and/or a conductive pattern. The buffer layer BFL may include a silicon oxide layer and a silicon nitride layer. The silicon oxide layer and the silicon nitride layer may be alternately stacked.

The semiconductor pattern is disposed on the buffer layer BFL. Hereinafter, the semiconductor pattern directly disposed on the buffer layer BFL is defined as a first semiconductor pattern. The first semiconductor pattern may include a silicon semiconductor. The first semiconductor pattern may include polysilicon. However, the embodiment of the present disclosure is not limited thereto. The first semiconductor pattern may include amorphous silicon.

FIG. 5 illustrates only a portion of the first semiconductor pattern, and the first semiconductor pattern may be further disposed in another region of the pixel PX (see FIG. 3). The first semiconductor pattern has different electrical properties depending on whether the first semiconductor pattern is doped or not. The first semiconductor pattern may include a doped region and a non-doped region. The doped region may be doped with an N-type dopant or a P-type dopant. A P-type transistor may include a doped region doped with the P-type dopant, and an N-type transistor may include a doped region doped with the N-type dopant.

The doped region is more conductive than the non-doped region, and may substantially serve as an electrode or a signal line. The non-doped region substantially corresponds to an active (or a channel) of a transistor. In other words, a portion of the first semiconductor pattern may be an active of a transistor, another portion thereof may be a source or a drain of the transistor, and the other portion thereof may be a connection signal line (or a connection electrode).

As illustrated in FIG. 5, a first electrode S1, a channel portion A1, and a second electrode D1 of a first transistor T1 are formed from the first semiconductor pattern. The first electrode S1 and the second electrode D1 of the first transistor T1 are disposed in opposite ends from each other from the channel portion A1.

FIG. 5 illustrates a portion of a connection signal line CSL formed from a semiconductor pattern. Although not separately illustrated, the connection signal line CSL may be connected to a second electrode of another transistor on a plane.

A first insulation layer 10 is disposed on the buffer layer BFL. The first insulation layer 10 commonly overlaps the plurality of the pixels PX (see FIG. 3), and covers the first semiconductor pattern. The first insulation layer 10 may be an inorganic layer and/or an organic layer, and may have a single-layered structure or multi-layered structure. The first insulation layer 10 may include at least one of aluminum oxide, titanium oxide, silicon oxide, silicon oxynitride, zirconium oxide, or hafnium oxide. In the present embodiment, the first insulation layer 10 may be a single-layered silicon nitride layer. Not only the first insulation layer 10, but also an insulation layer of the circuit layer DP_CL to be described layer may be an inorganic layer and/or an organic layer, and may have a single-layered or multi-layered structure. The inorganic layer may include at least one of the above-described materials.

On the first insulation layer 10, a third electrode G1 of the first transistor T1 is disposed. The third electrode G1 may be a part of a metal pattern. The third electrode G1 of the first transistor T1 overlaps the channel portion A1 of the first transistor T1. During a process of doping the first semiconductor pattern, the third electrode G1 of the first transistor T1 may serve as a mask.

On the first insulation layer 10, a second insulation layer 20 which covers the third electrode G1 is disposed. The second insulation layer 20 commonly overlaps the plurality of the pixels PX. The second insulation layer 20 may be an inorganic layer and/or an organic layer, and may have a single-layered or multi-layered structure. In the present embodiment, the second insulation layer 20 may be a single-layered silicon oxide layer.

On the second insulation layer 20, an upper electrode UE may be disposed. The upper electrode UE may overlap the third electrode G1. The upper electrode UE may be a portion of a metal pattern or a portion of a doped semiconductor pattern. A portion of the third electrode G1 and the upper electrode UE overlapping the same may define a capacitor. In an embodiment of the present disclosure, the upper electrode UE may be omitted.

In an embodiment of the present disclosure, the second insulation layer 20 may be replaced with an insulation pattern. On the insulation pattern, the upper electrode UE is disposed. The upper electrode UE may serve as a mask which formed an insulation pattern from the second insulation layer 20.

On the second insulation layer 20, a third insulation layer 30 which covers the upper electrode UE is disposed. In the present embodiment, the third insulation layer 30 may be a single-layered silicon oxide layer. On the third insulation layer 30, a semiconductor pattern is disposed. Hereinafter, the semiconductor pattern disposed directly on the third insulation layer 30 is defined as a second semiconductor pattern. The second semiconductor pattern may include a metal oxide. An oxide semiconductor may include a crystalline or amorphous oxide semiconductor. For example, the oxide semiconductor may include a metal oxide of such as zinc (Zn), indium (In), gallium (Ga), tin (Sn), and titanium (Ti), or a mixture of a metal such as zinc (Zn), indium (In), gallium (Ga), tin (Sn), and titanium (Ti) and an oxide thereof. The oxide semiconductor may include an indium-tin oxide (ITO), an indium-gallium-zinc oxide (IGZO), a zinc oxide (ZnO), an indium-zinc oxide (IZO), a zinc-indium oxide (ZIO), an indium oxide (InO), a titanium oxide (TiO), an indium-zinc-tin oxide (IZTO), a zinc-tin oxide (ZTO), and the like.

FIG. 5 illustrates only a portion of the second semiconductor pattern, and the second semiconductor pattern may be further disposed in another region of the pixel PX (see FIG. 3). The second semiconductor pattern may include a plurality of regions distinguished according to whether a metal oxide has been reduced or not. A region in which a metal oxide is reduced (hereinafter, a reduction region) has greater conductivity than a region in which a metal oxide is not reduced (hereinafter, a non-reduction region). The reduction region substantially serves as an electrode or a signal line. The non-reduction region substantially corresponds to a channel portion of a transistor. In other words, a portion of the second semiconductor pattern may be a channel portion of a transistor, and another portion thereof may be a first electrode or a second electrode of the transistor.

As illustrated in FIG. 5, a first electrode S2, a channel portion A2, and a second electrode D2 of a second transistor T2 are formed from the second semiconductor pattern. The first electrode S2 and the second electrode D2 include a metal reduced from a metal oxide semiconductor. The first electrode S2 and the second electrode D2 have a predetermined thickness from the upper surface of the second semiconductor pattern, and may include a metal layer including the reduced metal.

On the third insulation layer 30, a fourth insulation layer 40 which covers the second semiconductor pattern is disposed. In the present embodiment, the fourth insulation layer 40 may be a single-layered silicon oxide layer. On the fourth insulation layer 40, a third electrode G2 of the second transistor T2 is disposed. The third electrode G2 may be a part of a metal pattern. The third electrode G2 of the second transistor T2 overlaps the channel portion A2 of the second transistor T2.

In an embodiment of the present disclosure, the fourth insulation layer 40 may be replaced with an insulation pattern. On the insulation pattern, the third electrode G2 of the second transistor T2 is disposed. In the present embodiment, the third electrode G2 may have the same shape as that of the insulation pattern on a plane. In the present embodiment, for convenience of description, one third electrode G2 is illustrated. However, the second transistor T2 may include two third electrodes.

On the fourth insulation layer 40, a fifth insulation layer 50 which covers the third electrode G2 is disposed. In the present embodiment, the fifth insulation layer 50 may include a silicon oxide layer and a silicon nitride layer. The fifth insulation layer 50 may include a plurality of alternately stacked silicon oxide layers and silicon nitride layers.

On the fifth insulation layer 50, at least one insulation layer is further disposed. As in the present embodiment, a sixth insulation layer 60 and a seventh insulation layer 70 may be disposed on the fifth insulation layer 50. The sixth insulation layer 60 and the seventh insulation layer 70 may each be an organic layer, and may each have a single-layered structure or a multi-layered structure. The sixth insulation layer 60 and the seventh insulation layer 70 may each be a single-layered polyimide-based resin layer. However, the embodiment of the present disclosure is not limited thereto. The sixth insulation layer 60 and the seventh insulation layer 70 may include at least one of an acrylic resin, a methacrylic resin, polyisoprene, a vinyl-based resin, an epoxy-based resin, a urethane-based resin, a cellulose-based resin, a siloxane-based resin, a polyamide-based resin, or a perylene-based resin.

On the fifth insulation layer 50, a first connection electrode CNE10 may be disposed. The first connection electrode CNE10 may be connected to the connection signal line CSL through a first contact hole CH1 passing through the first to fifth insulation layers 10, 20, 30, 40, and 50, and a second connection electrode CNE20 may be disposed on the sixth insulation layer 60 and may be connected to the first connection electrode CNE10 through a contact hole CH-60 passing through the sixth insulation layer 60. In an embodiment of the present disclosure, at least one of the fifth insulation layer 50 and the sixth insulation layer 60 may be omitted.

The element layer DP_ED includes a light emitting element ED and a pixel definition film PDL. An anode AE of the light emitting element ED is disposed on the seventh insulation layer 70. The anode AE of the light emitting element ED may be connected to the second connection electrode CNE20 through a contact hole CH-70 passing through the seventh insulation layer 70.

An opening OP of the pixel definition film PDL exposes at least a portion of the anode AE of the light emitting element ED. The opening OP of the pixel definition film PDL may define a light emitting region PXA. For example, the plurality of pixels PX (see FIG. 3) may be disposed according to a predetermined rule on a plane of the display panel DP (see FIG. 3). A region in which the plurality of pixels PX are disposed may be defined as a pixel region, and one pixel region may include the light emitting region PXA and a non-light emitting region NPXA adjacent to the light emitting region PXA. The non-light emitting region NPXA may surround the light emitting region PXA.

A hole control layer HCL may be commonly disposed in the light emitting region PXA and the non-light emitting region NPXA. A common layer such as the hole control layer HCL may be commonly formed in the plurality of pixels PX. The hole control layer HCL may include a hole transport layer and a hole injection layer.

On the hole control layer HCL, a light emitting layer EML is disposed. The light emitting layer EML may be disposed only in a region corresponding to the opening OP. The light emitting layer EML may be divided and formed in each of the plurality of pixels PX.

Although a patterned light emitting layer EML is exemplarily illustrated in the present embodiment, the light emitting layer EML may be commonly disposed in the plurality of pixels PX. At this time, the light emitting layer EML may generate white light or blue light. In addition, the light emitting layer EML may have a multi-layered structure.

On the light emitting layer EML, an electron control layer ECL is disposed. The electron control layer ECL may include an electron transport layer and an electron injection layer. On the electron control layer ECL, a cathode CE of the light emitting element ED is disposed. The electron control layer ECL and the cathode CE are commonly disposed in the plurality of pixels PX.

The encapsulation layer TFE is disposed on the cathode CE. The encapsulation layer TFE may be cover the plurality of pixels PX. In the present embodiment, the encapsulation layer TFE directly covers the cathode CE. In an embodiment of the present disclosure, the display panel DP may further include a capping layer which directly covers the cathode CE. In an embodiment of the present disclosure, the stacking structure of the light emitting element ED may be structure inverted upside down from the structure illustrated in FIG. 5.

Referring to FIG. 6A, the display device DD of an embodiment includes the display panel DP, the input sensing layer ISL disposed on the display panel DP, the color filter layer CFL disposed on the input sensing layer ISL, the optical layer OPL disposed on the color filter layer CFL, and the window WM disposed on the optical layer OPL.

Referring to FIG. 6A, a first electrode layer is disposed on the circuit layer DP_CL. Over the first electrode layer, the pixel definition film PDL is formed. The first electrode layer may include first to third anodes AE1, AE2, and AE3. Each of the first to third openings OP1, OP2, and OP3 of the pixel definition film PDL exposes at least a portion of the first to third anodes AE1, AE2, and AE3. In an embodiment of the present disclosure, the pixel definition film PDL may further include a black material. The pixel definition film PDL may further include a black organic dye/pigment such as carbon black or aniline black. The pixel definition film PDL may be formed by mixing a blue organic material and a black organic material. The pixel definition film PDL may further include a liquid-repellent organic matter.

As illustrated in FIG. 6A, the display panel DP may include first to third light emitting regions PXA-R, PXA-G, and PXA-B and first to third non-light emitting regions NPXA-R, NPXA-G, and NPXA-B which are adjacent to the first to third light emitting regions PXA-R, PXA-G, and PXA-B. Each of the non-light emitting region NPXA-R, NPXA-G, and NPXA-B may surround corresponding light emitting regions PXA-R, PXA-G, and PXA-B. In the present embodiment, the first light emitting region PXA-R is defined to correspond to some regions of the first anode electrode AE1 exposed by the first opening OP1. The second light emitting region PXA-G is defined to correspond to some regions of the second anode electrode AE2 exposed by the second opening OP2. The third light emitting region PXA-B is defined to correspond to some regions of the third anode electrode AE3 exposed by the third opening OP3. Among the first to third non-light emitting regions NPXA-G, NPXA-R, and NPXA-B, a non-pixel region NPA may be defined.

On a first electrode, a light emitting layer may be disposed. The light emitting layer may include first to third light emitting layers EML1, EML2, and EML3. The first to third light emitting layers EML1, EML2, and EML3 may be disposed in regions corresponding to the first to third openings OP1, OP2, and OP3, respectively. The first to third light emitting layers EML1, EML2, and EML3 may be separately formed in first to third pixels PX-R, PX-G, and PX-B (see FIG. 4A). Each of the first to third light emitting layers EML1, EML2, and EML3 may include an organic material and/or an inorganic material. The first to third light emitting layers EML1, EML2, and EML3 may generate predetermined colored color light. For example, the first light emitting layer EML1 may generate red light, the second light emitting layer EML2 may generate green light, and the third light emitting layer EML3 may generate blue light.

In the present embodiment, patterned first to third light emitting layers EML1, EML2, and EML3 are illustrated, but one light emitting layer may be commonly disposed in the first to third light emitting regions PXA-R, PXA-G, and PXA-B. At this time, the light emitting layer may generate white light or blue light. The light emitting layer may have a multi-layered structure referred to as a tandem.

Each of the first to third light emitting layers EML1, EML2, and EML3 may include a low molecular weight organic matter or a high molecular weight organic matter as a light emitting material. Alternatively, each of the first to third light emitting layers EML1, EML2, and EML3 may include a quantum dot material as a light emitting material. A core of a quantum dot may be selected from a Group II-VI compound, a Group III-V compound, a Group IV-VI compound, a Group IV element, a Group IV compound, and a combination thereof.

On the light emitting layer, a second electrode layer is disposed. The second electrode layer may include first to third cathodes CE1, CE2, and CE3. The first to third cathodes CE1, CE2, and CE3 may be electrically connected to each other. As an example of the present disclosure, the first to third cathodes CE1, CE2, and CE3 may have an integral shape with each other. In this case, the first to third cathodes CE1, CE2, and CE3 may be commonly disposed in the first to third light emitting regions PXA-R, PXA-G, ad PXA-B, the first to third non-light emitting regions NPXA-G, NPXA-R, and NPXA-B, and the non-pixel region NPA.

The element layer DP_ED may further include the light sensing element OPD. The light sensing element OPD may be a photodiode. The fourth opening OP4 provided in correspondence to the light sensing element OPD may be defined in the pixel definition film PDL.

Each of the light sensing elements OPD may include a fourth anode AE4, a photoelectric conversion layer ORL, and a fourth cathode CE4. The fourth anode AE4 and the first electrode layer may be disposed on the same layer. That is, the fourth anode AE4 may be disposed on the element layer DP_CL, and may be simultaneously formed with the first to third anodes AE1, AE2, and AE3 through the same process.

The fourth opening OP4 of the pixel definition film PDL exposes at least a portion of the fourth anode AE4. The photoelectric conversion layer ORL is disposed on the fourth anode AE4 exposed by the fourth opening OP4. The photoelectric conversion layer ORL may include an organic photo-sensing material. The fourth cathode CE4 may be disposed on the photoelectric conversion layer ORL. The fourth cathode CE4 may be simultaneously formed with the first to third cathodes CE1, CE2, and CE3 through the same process. As an example of the present disclosure, the fourth cathode CE4 may have an integral shape with the first to third cathodes CE1, CE2, and CE3.

The fourth anode AE4 and the fourth cathode CE4 may each receive an electrical signal. The fourth cathode CE4 and the fourth anode AE4 may receive different signals. Accordingly, a predetermined electric field may be formed between the fourth anode AE4 and the fourth cathode CE4. The photoelectric conversion layer ORL generates an electrical signal corresponding to light incident on a sensor. The photoelectric conversion layer ORL may generate charges by absorbing the energy of the incident light. For example, the photoelectric conversion layer ORL may include a light sensitive semiconductor material.

The charges generated by the photoelectric conversion layer ORL change the electric field between the fourth anode AE4 and the fourth cathode CE4. The amount of charges generated in the photoelectric conversion layer ORL may vary depending on whether or not light is incident on the light sensing element OPD, and the amount and intensity of light incident on the light sensing element OPD. Accordingly, the electric field formed between the fourth anode AE4 and the fourth cathode CE4 may be changed. The light sensing element OPD according to the present disclosure may acquire a user's fingerprint information through changes in the electric field between fourth anode AE4 and the fourth cathode CE4.

However, this is only an example. Each of the light sensing elements OPD may include a phototransistor having the photoelectric conversion layer ORL as an active layer. At this time, each of the light sensing elements OPD may sense the amount of currents flowing in the phototransistor to acquire the fingerprint information. Each of the light sensing elements OPD according to an embodiment of the present disclosure may include various photoelectric conversion elements capable of generating an electrical signal in correspondence to changes in the amount of light, and is not limited to any one embodiment.

The encapsulation layer TFE is disposed on the element layer DP_ED. The encapsulation layer TFE includes at least an inorganic layer or an organic layer. In an embodiment of the present disclosure, the encapsulation layer TFE may include two inorganic layers and an organic layer disposed therebetween. In an embodiment of the present disclosure, a thin film encapsulation layer may include a plurality of inorganic layers and a plurality of organic layers which are alternately stacked.

An encapsulation inorganic layer protects the light emitting element ED from moisture/oxygen, and an encapsulation organic layer protects the light emitting element ED from foreign substances such as dust particles. The encapsulation inorganic layer may include a silicon nitride layer, a silicon oxynitride layer, a silicon oxide layer, a titanium oxide layer, an aluminum oxide layer, or the like, but is not particularly limited thereto. The encapsulation organic layer may include an acrylic organic layer, but is not particularly limited thereto.

The display device DD includes the input sensing layer ISL disposed on the display panel DP and the color filter layer CFL disposed on the input sensing layer ISL.

The input sensing layer ISL may be directly disposed on the encapsulation layer TFE. The input sensing layer ISL includes a first conductive layer ICL1, an insulation layer IL, a second conductive layer ICL2, and a protective layer PL. The first conductive layer ICL1 may be disposed on the encapsulation layer TFE. FIG. 6A illustrates a structure in which the first conductive layer ICL1 is directly disposed on the encapsulation layer TFE, but the present disclosure is not limited thereto. The input sensing layer ISL may further include a base insulation layer disposed between the first conductive layer ICL1 and the encapsulation layer TFE. In this case, the encapsulation layer TFE is covered by the base insulation layer, and the first conductive layer ICL1 may be disposed on the base insulation layer. As an example of the present disclosure, the base insulation layer may include an inorganic insulation material.

The insulation layer IL may cover the first conductive layer ICL1. The second conductive layer ICL2 is disposed on the insulation layer IL. A structure in which the input sensing layer ISL includes the first and second conductive layers ICL1 and ICL2 is illustrated, but the present disclosure is not limited thereto. For example, the input sensing layer ISL may include only one of the first and second conductive layers ICL1 and ICL2.

On the second conductive layer ICL2, the protective layer PL may be disposed. The protective layer PL may include an organic insulation material. The protective layer PL may protect the first and second conductive layers ICL1 and ICL2 from moisture/oxygen, and may serve to protect the first and second conductive layers ICL1 and ICL2 from foreign substances.

On the input sensing layer ISL, the color filter layer CFL may be disposed. The color filter layer CFL may be disposed directly on the protective layer PL. The color filter layer CFL may include a first color filter unit CF_R, a second color filter unit CF_G, and a third color filter unit CF_B. The first color filter unit CF_R has a first color, the second color filter unit CF_G has a second color, and the third color filter unit CF_B has a third color. As an example of the present disclosure, the first color may be red, the second color may be green, and the third color may be blue.

The color filter layer CFL may further include a dummy color filter unit DCF. As an example of the present disclosure, when a region in which the photoelectric conversion layer ORL is disposed is defined as a sensor region SA, and a region around the sensor region SA is defined as a non-sensor region NSA, the dummy color filter unit DCF may be disposed to correspond to the sensor region SA. The dummy color filter unit DCF may overlap the sensor region SA and the non-sensor region NSA. As an example of the present disclosure, the dummy color filter unit DCF and one of the first to third color filter units CF_R, CF_G, and CF_B may have the same color. As an example of the present disclosure, the dummy color filter unit DCF and the second color filter unit CF_G may have the same green color. In an embodiment, the dummy color filter unit DCF may be omitted.

The color filter layer CFL may further include a light blocking pattern BM. The light blocking pattern BM may overlap an edge of each of the first to third color filter units CF_R, CF_G, and CF_B, and may overlap an edge of the dummy color filter unit DCF.

The light blocking pattern BM includes a light blocking material, and the light blocking material included in the light blocking pattern BM is not particularly limited as long as it is a material which absorbs light. The light blocking pattern BM is a pattern having a black color, and in an embodiment, the light blocking pattern BM may include a black coloring agent. The black coloring agent may include a black dye, and or a black pigment. The black coloring agent may include carbon black, a metal such as chromium, or an oxide thereof.

The light blocking pattern BM may be disposed in correspondence to the non-pixel region NPA. The light blocking pattern BM may be disposed to overlap at least the non-pixel region NPA. The light blocking pattern BM may be disposed to overlap at least a portion of the first and second conductive layers ICL1 and ICL2 in the non-pixel region NPA. As an example of the present disclosure, the light blocking pattern BM may overlap the non-pixel region NPA, and the first to third non-light emitting regions NPXA-R, NPXA-G, and NPXA-B. The light blocking pattern BM may not overlap the first to third light emitting regions PXA-R, PXA-G, and PXA-B. The light blocking pattern BM may not overlap the sensor region SA. The light blocking pattern BM may not overlap the light sensing element OPD. The light blocking pattern BM may not overlap the photoelectric conversion layer ORL of the light sensing element OPD on a plane.

In an embodiment of the present disclosure, the light blocking pattern BM may not overlap the non-sensor region NSA. The light blocking pattern BM includes a first light blocking pattern unit BM-P disposed among the first to third light emitting regions PXA-R, PXR-G, and PXA-B, and a second light blocking pattern unit BM-S disposed between the first to third light emitting regions PXA-R, PXR-G, and PXA-B and the sensor region SA, wherein the sensor light blocking pattern unit BM-S may not overlap the non-sensor region NSA. The first light blocking pattern unit BM-P disposed among the first to third light emitting regions PXA-R, PXR-G, and PXA-B may be a component which prevents color mixing between adjacent light emitting regions. The second light blocking pattern unit BM-S disposed between the first to third light emitting regions PXA-R, PXR-G, and PXA-B and the sensor region SA may be a component which blocks light to increase the sensing precision of a sensor region adjacent to a light emitting region.

The color filter layer CFL may further include an overcoat layer OCL. The overcoat layer OCL may include an organic insulation material. The overcoat layer OCL may be provided to have a thickness enough to remove steps among the first to third color filter units CF_R, CF_G, and CF_B. The overcoat layer OCL may include any material without any particular limitation as long as it is a material having a predetermined thickness and capable of planarizing the upper surface of the color filter layer CFL, and may include, for example, an acrylate-based organic matter.

The optical layer OPL is disposed on the color filter layer CFL. The optical layer OPL includes an optical pattern UBM. The optical pattern UBM overlaps at least a portion of the light sensing element OPD. The optical pattern UBM overlaps the photoelectric conversion layer ORL of the light sensing element OPD on a plane. That is, the optical pattern UBM may be disposed in a portion of the sensor region SA. The optical pattern UBM may be disposed in the non-sensor region NSA adjacent to the sensor region SA. FIG. 6A illustrates that the optical pattern UBM does not overlap the first non-light emitting region NPXA-R and the second non-light emitting region NPXA-G, but the embodiment of the present disclosure is not limited thereto. The optical pattern UBM may be disposed to overlap a portion of the first non-light emitting region NPXA-R and the second non-light emitting region NPXA-G.

The optical pattern UBM includes a light blocking material, and the light blocking material included in the optical pattern UBM is not particularly limited as long as it is a material which absorbs light. The optical pattern UBM is a pattern having a black color, and in an embodiment, the optical pattern UBM may include a black coloring agent. The black coloring agent may include a black dye and a black pigment. The black coloring agent may include carbon black, a metal such as chromium, or an oxide thereof. In an embodiment, the optical pattern UBM and the light blocking pattern BM may include the same material.

A portion of the optical pattern UBM may be disposed to overlap the light blocking pattern BM on a plane. The optical pattern UBM may overlap the second light blocking pattern unit BM-S on a plane. The optical pattern UBM may overlap the light blocking pattern BM in the non-pixel region NPA.

The optical pattern UBM may include a first sub-optical pattern UBM-S1 and a second sub-optical pattern UBM-S2. On a cross-section, the first sub-optical pattern UBM-S1 and the second sub-optical pattern UBM-S2 are disposed spaced apart from each other, and a separated portion between the first sub-optical pattern UBM-S1 and the second sub-optical pattern UBM-S2 may be disposed in the sensor region SA. A separation distance d1 (see FIG. 8A) between the first sub-optical pattern UBM-S1 and the second sub-optical pattern UBM-S2 may be smaller than the width of the sensor region SA.

Referring back to the light blocking pattern BM of the color filter layer CFL, the second light blocking pattern unit BM-S may include a first sub-light blocking pattern BM-S1 and a second sub-light blocking pattern BM-S2. On a cross-section, the first sub-light blocking pattern BM-S1 and the second sub-light blocking pattern BM-S2 are disposed spaced apart from each other, and a separated portion between the first sub-light blocking pattern BM-S1 and the second sub-light blocking pattern BM-S2 may overlap the sensor region SA and the non-sensor region NSA. A separation distance d2 (see FIG. 8A) between the first sub-light blocking pattern BM-S1 and the second sub-light blocking pattern BM-S2 may be larger than the width of the sensor region SA.

Each of the first sub-optical pattern UBM-S1 and the second sub-optical pattern UBM-S2 may include an optical inner surface UBM-SL and an optical outer surface UBM-SS opposing the optical inner surface UBM-SL which are defined in the separated portion between the first sub-optical pattern UBM-S1 and the second sub-optical pattern UBM-S2. Each of the first sub-light blocking pattern BM-S1 and the second sub-light blocking pattern BM-S2 may include a light blocking inner surface BM-SL and a light blocking outer surface BM-SS opposing the light blocking inner surface BM-SL which are defined in the separated portion between the first sub-light blocking pattern BM-S1 and the second sub-light blocking pattern BM-S2.

The optical inner surface UBM-SL may be disposed to overlap the sensor region SA, and the light blocking inner surface BM-SL may be disposed to overlap the non-pixel region NPA. The optical outer surface UBM-SS may be disposed to overlap the non-pixel region NPA, and the light blocking outer surface BM-SS may be disposed to overlap the first non-light emitting region NPXA-R or the second non-light emitting region NPXA-G. The optical outer surface UBM-SS may be disposed more inward than the light blocking outer surface BM-SS. In other words, the optical outer surface UBM-SS may be disposed more adjacent to the sensor region SA than the light blocking outer surface BM-SS.

The optical layer OPL may further include an additional organic layer TOL1 and an organic planarization layer TOL2. The additional organic layer TOL1 and the organic planarization layer TOL2 are optically transparent layers, and may be formed using an organic matter.

The additional organic layer TOL1 may be disposed on the overcoat layer OCL, and may contact the upper surface of the overcoat layer OCL. The optical pattern UBM may be disposed on the additional organic layer TOL1. The optical pattern UBM may contact the upper surface of the additional organic layer TOL1.

The organic planarization layer TOL2 may be disposed on the optical pattern UBM, and may over an upper portion of the optical pattern UBM. The organic planarization layer TOL2 may be a layer which covers steps formed by the optical pattern UBM to planarize the upper surface of the optical layer OPL. By the organic planarization layer TOL2, the optical layer OPL may have a flat upper surface. In a portion in which the optical pattern UBM is not disposed, the organic planarization layer TOL2 may be disposed directly on the additional organic layer TOL1.

On the optical layer OPL, the window WM may be disposed. Although not illustrated, the display device DD may further include an adhesive layer disposed between the optical layer OPL and the window WM. On an upper surface WM-U of the window WM, a sensing region SAA to be described later may be defined.

Referring to FIG. 6B, compared to the display device DD of an embodiment illustrated in FIG. 6A, in an optical layer OPL-1 included in a display device DD-1 of another embodiment, the additional organic layer TOL1 may be omitted. That is, the optical layer OPL-1 may include the optical pattern UBM and the organic planarization layer TOL2.

The optical pattern UBM included in the optical layer OPL-1 may be disposed on the overcoat layer OCL of the color filter layer CFL. The optical pattern UBM may be disposed directly on the overcoat layer OCL to contact the upper surface of the overcoat layer OCL. In a portion in which the optical pattern UBM is not disposed, the organic planarization layer TOL2 may be disposed directly on the overcoat layer OCL.

Referring to FIG. 6C, compared to the display device DD of an embodiment illustrated in FIG. 6A, in a color filter layer CFL' included in a display device DD-2 of another embodiment, the second light blocking pattern unit BM-S may be omitted. The color filter layer CFL' included in the display device DD-2 may include only the first light blocking pattern unit BM-P as the light blocking pattern BM. In the color filter layer CFL' included in the display device DD-2, the second light blocking pattern unit BM-S is omitted, so that a separate light blocking pattern may not be disposed between the first to third light emitting regions PXA-R, PXR-G, and PXA-B and the sensor region SA.

An optical layer OPL-2 included in the display device DD-2 of another embodiment includes the optical pattern UBM', and the optical pattern UBM' may overlap the sensor region SA, the non-sensor region NSA, and the non-pixel region NPA. Furthermore, the optical pattern UBM' may additionally overlap a portion of the first non-light emitting region NPXA-R and the second non-light emitting region NPXA-G. The optical pattern UBM' may include a first sub-optical pattern UBM-S1' and a second sub-optical pattern UBM-S2' spaced apart from each other with respect to the sensor region SA interposed therebetween.

Compared to the display device DD of an embodiment illustrated in FIG. 6A, in the display device DD-2 of another embodiment illustrated in FIG. 6C, the second light blocking pattern unit BM-S may be omitted, and the optical pattern UBM' may be disposed to overlap a portion of the first non-light emitting region NPXA-R and the second non-light emitting region NPXA-G, which is a region in which the omitted second light blocking pattern unit BM-S used to be disposed. Accordingly, the optical pattern UBM' may perform a function to increase the sensing precision of a sensor region adjacent to a light emitting region.

Figure 7:
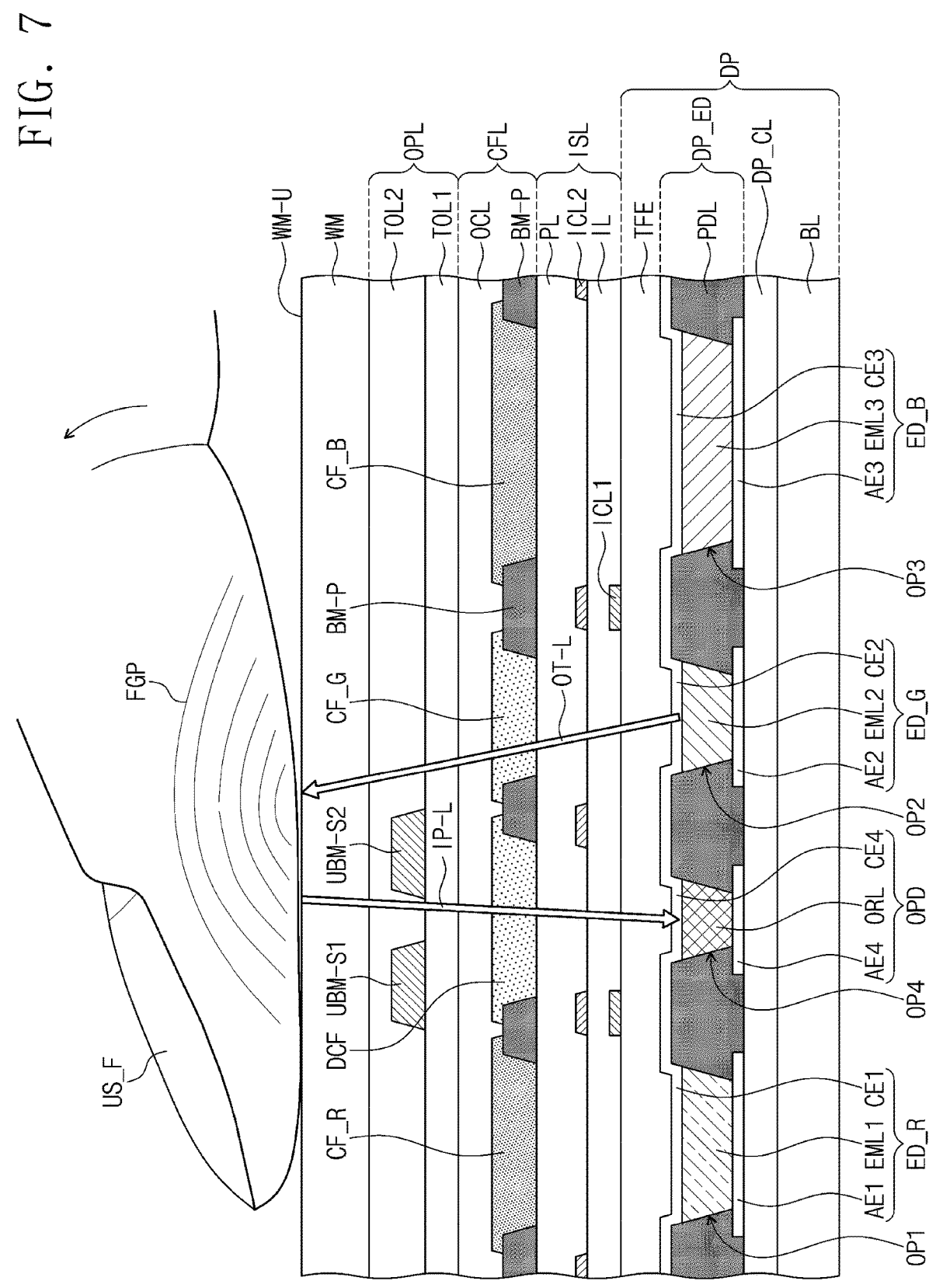
FIG. 7 is a cross-sectional view showing one operational state of a display device according to an embodiment of the present disclosure.

FIG. 7 is a cross-sectional view showing one operational state of a display device according to an embodiment of the present disclosure. FIG. 7 illustrates the state in which a fingerprint FGP, which is a piece of biometric information input through the user's hand US_F, is recognized in the display device DD illustrated in FIG. 6A.

Referring to FIG. 6A and FIG. 7 together, when the display device DD (see FIG. 1) operates, each of the first to third light emitting elements ED_R, ED_G, and ED_B may output light. The first light emitting elements ED_R output a first light, the second light emitting elements ED_G output a second light, and the third light emitting elements ED_B output a third light. Here, the first light may be light of a red wavelength band, the second light may be light of a green wavelength band, and the third light may be light of a blue wavelength band.

In the display device DD according to an embodiment, the light sensing element OPD may receive light from specific light emitting elements (e.g., the second light emitting element ED_G) among the first to third light emitting elements ED_R, ED_G, and ED_B. Emitted light OT-L emitted from the second light emitting element ED_G may be reflected off an external object (e.g., the fingerprint FGP of the user's hand US_F in the present embodiment) and be incident on the light sensing element OPD included in the element layer DP_ED as reflected light IP-L. The reflected light IP-L incident on the light sensing element OPD may be light of a visible light region. The light sensing element OPD may change the driving state of the display device DD by receiving incident light and converting the received incident light into an electrical signal to recognize an external input.

Each of the emitted light OT-L and the reflected light IP-L may be light of a specific wavelength region. For example, each of the emitted light OT-L and the reflected light IP-L may be light of a green wavelength band. In an upper portion of the light sensing element OPD, the dummy color filter unit DCF is disposed, and the dummy color filter unit DCF may have a specific color, for example, green, so that the reflected light IP-L may pass through the dummy color filter unit DCF to be incident on the light sensing element OPD. Meanwhile, the first light and the third light respectively output from the first light emitting element ED_R and the third light emitting element ED_B may also be reflected off the user's hand US_F, but reflected light, which is the first light and the third light reflected from the user's hand US_F, may be absorbed without passing through the dummy color filter unit DCF. Accordingly, only light of a specific wavelength region may be provided to the light sensing element OPD, and light of other wavelength regions may not be provided thereto.

Figure 8A:
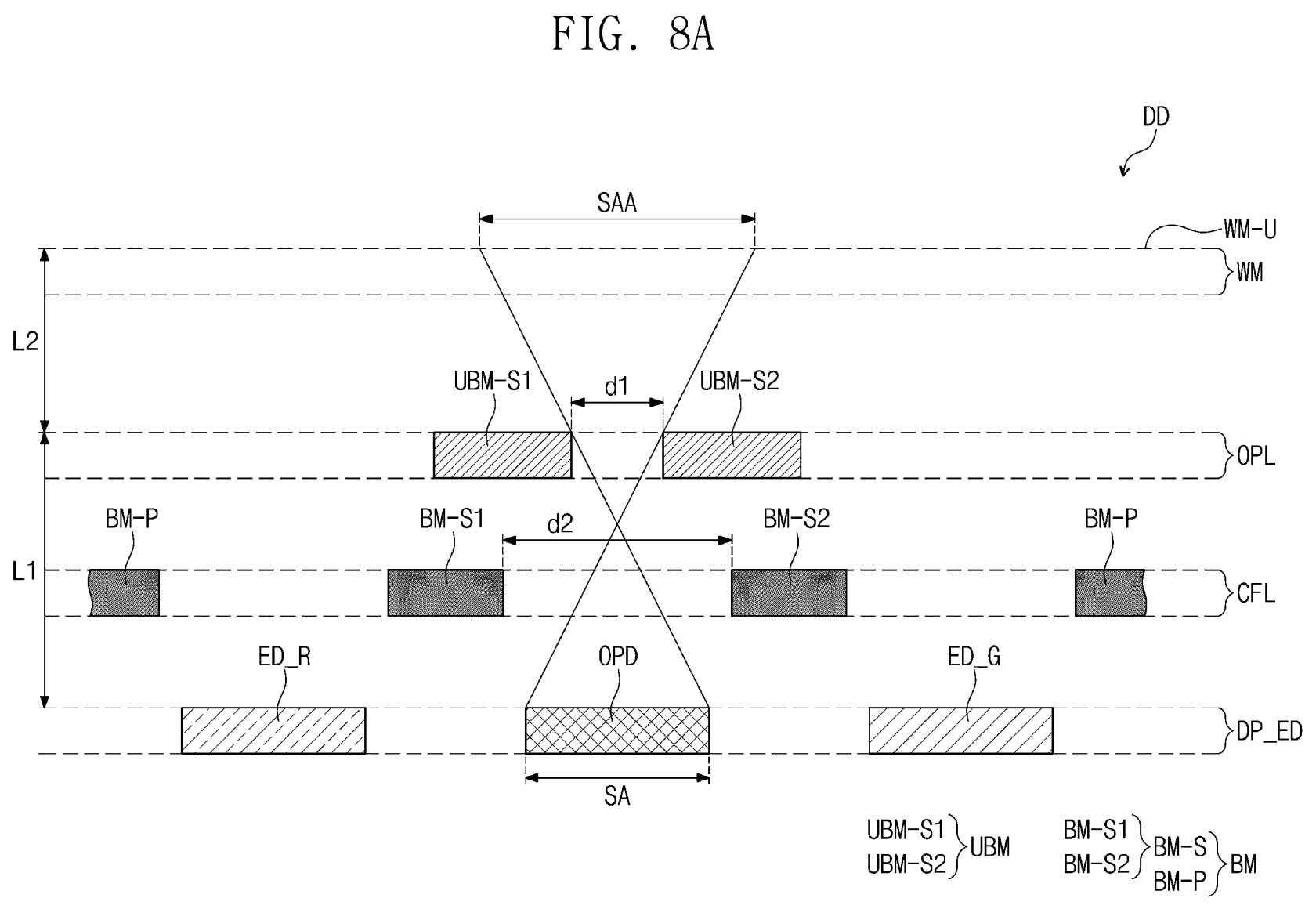
Figure 8B:
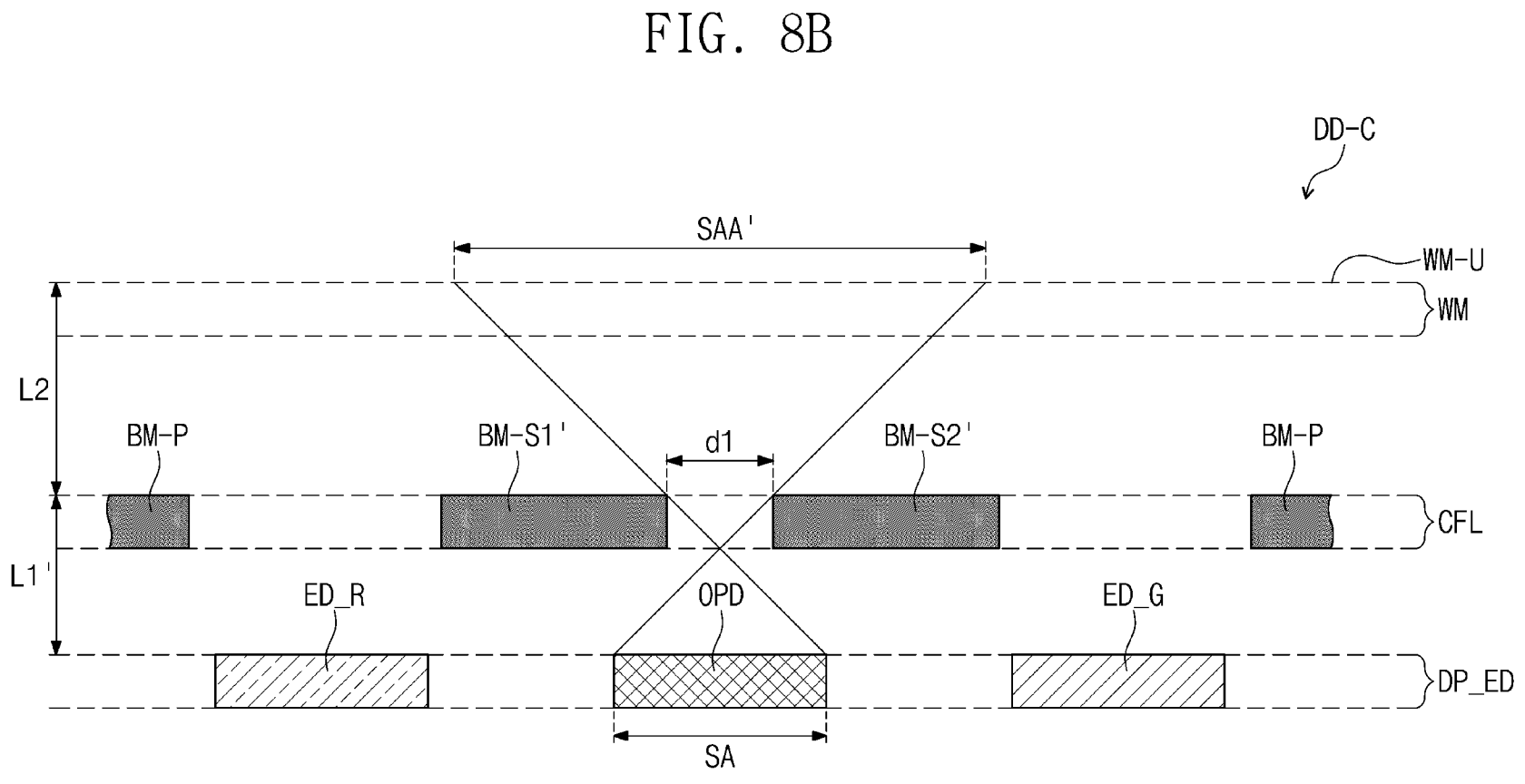

FIG. 8A is a schematic view schematically showing some components of a display device according to an embodiment of the present disclosure. FIG. 8B is a schematic view schematically showing some components of a display device according to a comparative example. FIG. 8A schematically illustrates the structure of the display device DD, which includes the light sensing element OPD, the first light emitting element ED_R, and the second light emitting element ED_G included in the emitting element DP_ED, the light blocking pattern BM included in the color filter layer CFL, the optical pattern UBM included in the optical layer OPL, and the window WM, in a schematic layer and block structure. FIG. 8B schematically illustrates the structure of a display device DD-C of a comparative example, in which the optical layer OPL including the optical pattern UBM is omitted, in a schematic layer and block structure.

Referring to FIG. 6A and FIG. 8A together, in the display device DD of an embodiment, the sensing region SAA of the light sensing element OPD may be defined on the upper surface WM-U of the window WM, and in the light sensing element OPD, the width of the sensing region SAA may be determined by an optical member disposed in an upper portion of the light sensing element OPD. In the display device DD of an embodiment, the optical member may be the optical pattern UBM included in the optical layer OPL. In the display device DD of an embodiment, the width of the sensing region SAA may be determined by a distance L1 from an upper surface of the light sensing element OPD to an upper surface of the optical member.

The width of the sensing region SAA is calculated using the width of the sensor region SA, the separation distance d1 between the first sub-optical pattern UBM-S1 and the second sub-optical pattern UBM-S2, the distance L1 from the upper surface of the light sensing element OPD to an upper surface of the optical pattern UBM, and a distance L2 from the upper surface of the optical pattern UBM to the upper surface WM-U of the window WM.

More specifically, when the width of the sensing region SAA is $S_1$, the width of the sensor region SA is S2, the separation distance between the first sub-optical pattern UBM-S1 and the second sub-optical pattern UBM-S2 is d1, the distance from the upper surface of the light sensing element OPD to the upper surface of the optical pattern UBM is L1, and the distance from the upper surface of the optical pattern UBM to the upper surface WM-U of the window WM is L2, the width S1 of the sensing region SAA may be calculated by Equation 1 below.

$$S_1 = d1 + \frac{L2}{L1}(d1 + S_2) \qquad \text{[Equation 1]}$$

Referring to Equation 1 above, it can be seen that the width $S_1$ of the sensing region SAA becomes smaller as the separation distance d1 between the first sub-optical pattern UBM-S1 and the second sub-optical pattern UBM-S2 decreases, and becomes smaller as the distance L1 from the upper surface of the light sensing element OPD to the upper surface of the optical pattern UBM increases.

The display device DD according to an embodiment of the present disclosure has a structure in which a separate optical layer OPL is disposed on the color filter layer CFL, and the optical pattern UBM included in the optical layer OPL is disposed to overlap a portion of the light sensing element OPD, so that the width $S_1$ of the sensing region SAA may be designed to be small. Specifically, the optical pattern UBM includes the first sub-optical pattern UBM-S1 and the second sub-optical pattern UBM-S2, and the separation distance d1 between the first sub-optical pattern UBM-S1 and the second sub-optical pattern UBM-S2 is designed to be smaller than the width S2 of the sensor region SA, so that the width $S_1$ of the sensing region SAA may be reduced. In addition, since it is a structure in which the width S1 of the sensing region SAA of the light sensing element OPD is determined not by the light blocking pattern BM included in the color filter layer CFL but by the optical pattern UBM of the optical layer OPL disposed in an upper portion of the color filter layer CFL, the width S1 of the sensing region SAA may be reduced since the distance L1 from the upper surface of the light sensing element OPD to the upper surface of the optical member increases.

That is, the display device DD of an embodiment applies the optical pattern UBM provided on the color filter layer CFL as an optical member of the light sensing element OPD, so that the width $S_1$ of the sensing region SAA may be designed to be small. The display device DD of an embodiment may design the width of the sensing region SAA to be small, so that the problem of color mixing between the reflected light IP-L (see FIG. 7) entering the light sensing element OPD and light of a different wavelength may be prevented, and accordingly, the biometric information of a user may be more precisely sensed.

Referring to FIG. 8A and FIG. 8B together, in the display device DD-C of the comparative example in which the optical layer OPL is omitted, an optical member which determines the width of the sensing region SAA of the light sensing element OPD may be the light blocking pattern BM included in the color filter layer CFL.

In the display device DD-C of the comparative example, the light blocking pattern BM is applied as an optical member, so that the width of a sensing region SAA' increases compared to the display device DD of an example. In the display device DD-C of the comparative example, the distance from the upper surface of the light sensing element OPD to an upper surface of the optical member, that is, a distance L1' from the upper surface of the light sensing element OPD to an upper surface of each of a first sub-light blocking pattern BM-S1' and a second sub-light blocking pattern BM-S2' becomes smaller than the L1 of the example, the width of the sensing region SAA' increases compared to the display device DD of the example. Furthermore, even when the designs of the first sub-light blocking pattern BM-S1' and the second sub-light blocking pattern BM-S2' are changed in the display device DD-C of the comparative example to reduce the separation distance between the first sub-light blocking pattern BM-S1' and the second sub-light blocking pattern BM-S2' to the level of d1, which is the separation distance between the first sub-optical pattern UBM-S1 and the second sub-optical pattern UBM-S2, the distance L1' from the upper surface of the light sensing element OPD to the upper surface of the optical member is smaller than the L1 of the example, the width of the sensing region SAA' increases compared to the display device DD of the example.

According to a display device of an embodiment of the present disclosure, a display panel is equipped with a pixel and a sensor, and the sensing region of the sensor may be designed to be sufficiently small by an optical layer disposed on the display panel. Accordingly, the display device of an embodiment may sense the biometric information of a user more precisely.

Although the present disclosure has been described with reference to a preferred embodiment of the present disclosure, it will be understood by those skilled in the art that various changes in form and details may be made therein without departing from the spirit and scope of the present disclosure as set forth in the following claims. Accordingly, the technical scope of the present disclosure is not intended to be limited to the contents set forth in the detailed description of the specification, but is intended to be defined by the appended claims.

What is claimed is:

1. A display device comprising:
a base layer on which a pixel region, a sensor region, and a peripheral region adjacent to the pixel region and the sensor region are defined;
an element layer including a light emitting element having a light emitting layer disposed in the pixel region, a light sensing element having a photoelectric conversion layer disposed in the sensor region, and a pixel definition film on which openings are defined;
a light blocking pattern disposed on the element layer and overlapping a portion of the peripheral region; and
an optical pattern disposed on the light blocking pattern, wherein at least a portion of the optical pattern overlaps the photoelectric conversion layer on a plane, and
an opening among the openings defined in the pixel definition film, which is corresponding to the light sensing element and in which at least a portion of the photoelectric conversion layer is disposed, an opening defined by light blocking inner surfaces of the light blocking pattern, and an opening defined by optical inner surfaces of the optical pattern overlap each other on a plane.

2. The display device of claim 1, wherein the light blocking pattern and the optical pattern include a light blocking material.

3. The display device of claim 1, further comprising a color filter layer disposed on the element layer and including a plurality of color filter units,
wherein the light blocking pattern overlaps an edge of each of the plurality of color filter units.

4. The display device of claim 3, wherein the color filter layer further includes an overcoat layer covering the plurality of color filter units, wherein the optical pattern is disposed on the overcoat layer.

5. The display device of claim 4, further comprising an additional organic layer disposed on the overcoat layer, wherein the optical pattern is disposed on an upper surface of the additional organic layer.

6. The display device of claim 1, further comprising an organic planarization layer disposed on the optical pattern and covering the optical pattern.

7. The display device of claim 1, wherein
the peripheral region includes a non-sensor region adjacent to the sensor region; and
the optical pattern overlaps the non-sensor region.

8. The display device of claim 7, wherein
the light blocking pattern includes a first sub-light blocking pattern and a second sub-light blocking pattern which at least partially overlap the optical pattern; and on a cross-section, a separation distance between the first sub-light blocking pattern and the second sub-light blocking pattern is larger than a width of the sensor region.

9. The display device of claim 8, wherein
the optical pattern overlaps the light sensing element on a plane and includes a first sub-optical pattern and a second sub-optical pattern spaced apart from the first sub-optical pattern; and
on a cross-section, a separation distance between the first sub-optical pattern and the second sub-optical pattern is smaller than the width of the sensor region.

10. The display device of claim 9, wherein
the first sub-light blocking pattern and the second sub-light blocking pattern include the light blocking inner surfaces overlapping the non-sensor region and light blocking outer surfaces facing the light blocking inner surfaces;
the first sub optical pattern and the second sub-optical pattern include the optical inner surface overlapping the sensor region and an optical outer surface facing the optical inner surface; and
the optical outer surfaces are disposed more adjacent to the sensor region than the light blocking outer surfaces.

11. The display device of claim 7, wherein the light blocking pattern does not overlap the non-sensor region.

12. The display device of claim 1, further comprising a window disposed on the optical pattern,
wherein a sensing region of the light sensing element is defined on an upper surface of the window.

13. The display device of claim 1, further comprising an input sensing layer disposed between the element layer and the light blocking pattern.

14. The display device of claim 1, wherein
the light emitting element is an organic light emitting diode, and
the light sensing element is an organic photodiode.

15. The display device of claim 1, wherein an opening corresponding to the light emitting element among the openings defined in the pixel definition film and the opening defined by optical inner surfaces of the optical pattern does not overlap each other on a plane.

16. The display device of claim 1, wherein the light emitting elements are provided in plural, and
on a cross-section, the optical pattern is arranged adjacent to some of the plurality of light emitting elements and not adjacent to the rest of the plurality of light emitting elements.

17. A display device comprising:
a base layer on which a pixel region, a sensor region, and a peripheral region adjacent to the pixel region and the sensor region are defined;
an element layer including a light emitting element disposed in the pixel region, a light sensing element disposed in the sensor region;
a color filter layer disposed on the element layer,
an optical pattern disposed on the color filter layer; and
a window disposed on the optical pattern,
wherein a distance from an upper surface of the optical pattern to an upper surface of the window is smaller than a distance from an upper surface of the color filter layer to the upper surface of the window, and
the peripheral region includes a non-sensor region adjacent to the sensor region; and
the optical pattern overlaps the non-sensor region.

18. The display device of claim 17, wherein the light sensing element includes:

an anode disposed on the base layer;

a photoelectric conversion layer disposed on the anode; and a cathode disposed on the photoelectric conversion layer, and wherein at least a portion of the optical pattern overlaps the photoelectric conversion layer on a plane.

19. The display device of claim 17, wherein the color filter layer includes:

a plurality of color filter units;

the light blocking pattern overlapping an edge of each of the plurality of color filter units; and an overcoat layer covering the plurality of color filter units, wherein the optical pattern is disposed on the overcoat layer.

20. A display device in which a pixel region, a sensor region, and a peripheral region adjacent to the pixel region and the sensor region are defined, the display device comprising:

an element layer including a light emitting element having a light emitting layer disposed in the pixel region and a light sensing element having a photoelectric conversion layer disposed in the sensor region, and a pixel definition film on which openings are defined;

a color filter layer disposed on the element layer and including a light blocking pattern which overlaps a portion of the peripheral region;

an optical layer including an optical pattern disposed on the light blocking pattern; and a window disposed on the optical layer, wherein at least a portion of the optical pattern overlaps the photoelectric conversion layer on a plane, and an opening among the openings defined in the pixel definition film, which is corresponding to the light sensing element and in which at least a portion of the photoelectric conversion layer is disposed does not overlap the light blocking pattern on a plane.

\* \* \* \* \*